358-140. XR 3,073,896 SR

Jan. 15, 1963 D. B. JAMES 3,073,896

VIDEO INTERCHANGE BY DIGITAL BAND AND SCAN CONVERSIONS

Filed May 31, 1960 16 Sheets-Sheet 1

T5281
X5055
X5051

INVENTOR
D.B. JAMES
BY Harry C. Hart
ATTORNEY

VIDEO INTERCHANGE BY DIGITAL BAND AND SCAN CONVERSIONS

Filed May 31, 1960 16 Sheets-Sheet 2

INVENTOR
D. B. JAMES
BY Harry C. Hart
ATTORNEY

Jan. 15, 1963 D. B. JAMES 3,073,896

VIDEO INTERCHANGE BY DIGITAL BAND AND SCAN CONVERSIONS

Filed May 31, 1960 16 Sheets-Sheet 3

INVENTOR
D. B. JAMES
BY Harry C. Hart
ATTORNEY

VIDEO INTERCHANGE BY DIGITAL BAND AND SCAN CONVERSIONS

Filed May 31, 1960 16 Sheets-Sheet 4

INVENTOR
D. B. JAMES
BY Harry C. Hart
ATTORNEY

Jan. 15, 1963 D. B. JAMES 3,073,896

VIDEO INTERCHANGE BY DIGITAL BAND AND SCAN CONVERSIONS

Filed May 31, 1960 16 Sheets-Sheet 5

INVENTOR
D.B. JAMES
BY Harry C. Hart
ATTORNEY

Jan. 15, 1963 D. B. JAMES 3,073,896

VIDEO INTERCHANGE BY DIGITAL BAND AND SCAN CONVERSIONS

Filed May 31, 1960 16 Sheets-Sheet 6

INVENTOR
D.B. JAMES
BY
Harry C. Hart
ATTORNEY

Jan. 15, 1963 D. B. JAMES 3,073,896

VIDEO INTERCHANGE BY DIGITAL BAND AND SCAN CONVERSIONS

Filed May 31, 1960 16 Sheets-Sheet 7

INVENTOR
D. B. JAMES
BY Harry C. Hart
ATTORNEY

INVENTOR
D. B. JAMES
BY Harry C. Hart
ATTORNEY

INVENTOR
D. B. JAMES
BY Harry C. Hart
ATTORNEY

VIDEO INTERCHANGE BY DIGITAL BAND AND SCAN CONVERSIONS

Filed May 31, 1960 16 Sheets-Sheet 10

INVENTOR
D. B. JAMES
BY
Harry C. Hart
ATTORNEY

Jan. 15, 1963 D. B. JAMES 3,073,896

VIDEO INTERCHANGE BY DIGITAL BAND AND SCAN CONVERSIONS

Filed May 31, 1960 16 Sheets-Sheet 11

INVENTOR
D. B. JAMES
BY Harry C. Hart
ATTORNEY

Jan. 15, 1963 D. B. JAMES 3,073,896

VIDEO INTERCHANGE BY DIGITAL BAND AND SCAN CONVERSIONS

Filed May 31, 1960 16 Sheets-Sheet 12

INVENTOR
D. B. JAMES
BY Harry C. Hart
ATTORNEY

Jan. 15, 1963 D. B. JAMES 3,073,896

VIDEO INTERCHANGE BY DIGITAL BAND AND SCAN CONVERSIONS

Filed May 31, 1960 16 Sheets-Sheet 13

INVENTOR
D. B. JAMES
BY Harry C. Hart
ATTORNEY

INVENTOR
D. B. JAMES
BY Harry C. Hart
ATTORNEY (CONTROLLER 150-B)

INVENTOR
D. B. JAMES
BY Harry C. Hart
ATTORNEY

INVENTOR
D. B. JAMES
BY Harry C. Hart
ATTORNEY 3,073,896
Patented Jan. 15, 1963

3,073,896

VIDEO INTERCHANGE BY DIGITAL BAND AND SCAN CONVERSIONS

Dennis B. James, Far Hills, N.J., assignor to Bell Telephone Laboratories, Incorporated, New York, N.Y., a corporation of New York Filed May 31, 1960, Ser. No. 32,734
10 Claims. (Cl. 178—6)

Figure 1:
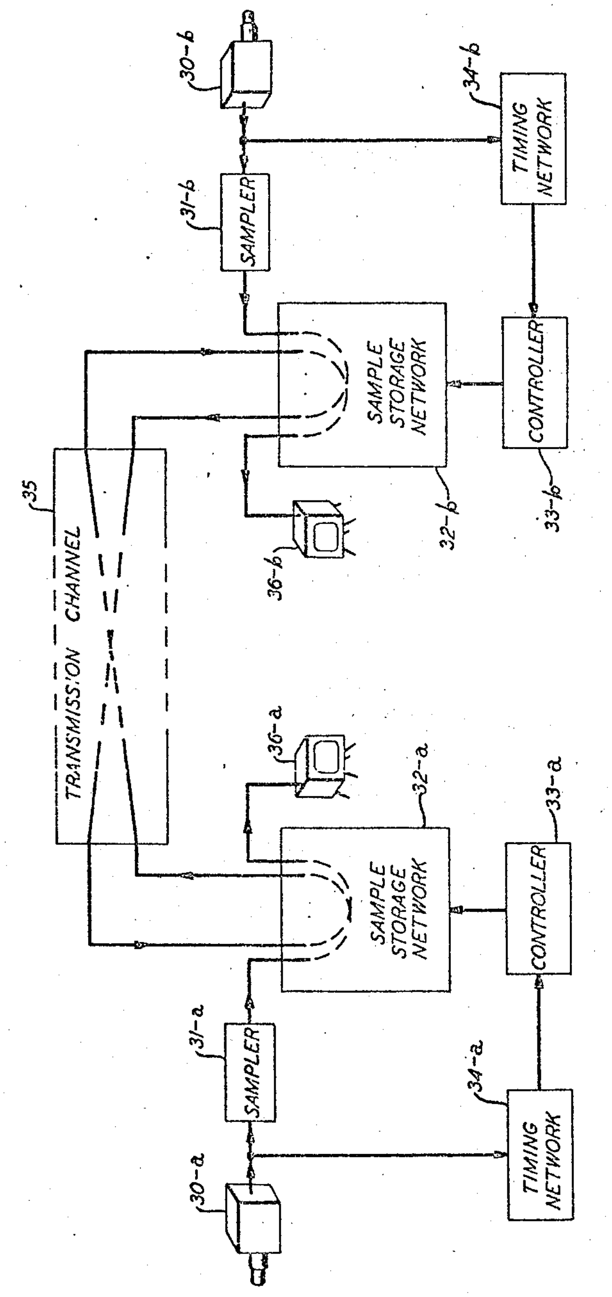

This invention relates to the interchange of information between systems operating at different rates and interconnected by a transmission channel of limited bandwidth. For its principal object it seeks to facilitate and to coordinate the band and scan conversions of the interchanged information.

Band conversion is needed whenever wide band signals are adapted to the capability of a lesser bandwidth channel, such as that provided by a transoceanic cable. It is of utility in reducing the bandwidth required for the transmission of pulse code modulated signals, and it is desirable when video signals frequency modulate a carrier dispatched over great distances by scatter techniques or by reflection from an artificial satellite. Under these latter circumstances the modulating signals must be constrained to a limited bandwidth if an adequate signal-to-noise ratio is to be attained on reception when the energy available for transmission is limited. In any event, if the demodulated signals are to be of high quality and to appear continuously, band conversion must take place rapidly. Consequently, it is one object of the invention to achieve band conversion at a greater rate and with greater picture quality than heretofore attainable.

Scan conversion, on the other hand, is required whenever picture information is processed by interconnected systems operating at different rates. With picture information two distinct rates or time dimensions must be considered. The scan rate of a scene determines one time dimension, usually the horizontal one, while the frame repetition rate establishes another time dimension, usually the vertical one. If scan conversion is attempted with conventional storage mechanisms, such as photographic film or storage tubes, registration difficulties are accompanied by excessive time delay, in the case of the film, and the absence of storage uniformity, in the case of the tubes. It is a further object of the invention to circumvent the need for registration and to render, with great rapidity, diverse horizontal and vertical time dimensions wholly compatible. A related object is to achieve simultaneity of the scan and band conversions.

The bandwidth of transmitted signals determines horizontal resolution while the density of horizontal scan lines controls vertical resolution. Image continuity, on the other hand, depends upon frame rate. A consequence of band conversion is the sacrifice of either resolution or image continuity in reconstituted pictures. Accordingly, a further object of the invention is to transmit reduced bandwidth video signals, while preserving horizontal and vertical resolutions and image continuity in amounts which are harmoniously proportioned with respect to a viewer.

When the numbers of scanning lines in the individual frames of two video systems are unequal, an attempt to convert from one to the other may cause the reconstituted pictures either to be geometrically distorted because of an altered aspect ratio or to have a wavering appearance attributable to moire patterns. In another of its aspects the invention maintains a constant aspect ratio and prevents the occurrence of moire patterns in reconstituted pictures derived from interchanged video signals.

Band conversion inevitably requires storage of the signals to be processed in order to allow an exchange of time for bandwidth. A yet further aspect of the invention is the use of the storage network for scan conversion as well.

For the purposes of definition the term "format" is used to identify the distinctive magnitudes of the multiplicity of factors involved in the generation of picture signals. Such factors include aspect ratio, bandwidth, the number of lines and the number of picture elements in a frame, as well as all scan times, including blanking periods.

The invention is characterized by the distinctive identification of picture elements comprising signals interchanged between diverse systems. Incompatibilities of format and limitations of bandwidth are surmouned through the control of the times of occurrence and rates of appearance of individual picture elements. This maintenance of picture element identities permits a line-by-line matching between transmitted picture signals and reconstituted pictures and thereby prevents the occurrence of moire patterns while avoiding registration difficulties.

According to the invention a format is selected as a standard for the transmission of periodically selected "frames," each of which consists of a pair of fields that are immediately sequential in time. The format designated as a reference may be the one supplying the transmission channel with maximum information content, i.e., the greatest number of picture elements per scanned line. Or the reference format may be chosen primarily on the vasis of preserving image continuity. When the reference format is that in which picture signals are generated at a particular geographical location, that location is designated a reference situs, and only band conversion takes place there. At the remaining locations, designated co-ordinate situses, scan conversion, performed simultaneously with the band conversion, is required as well. On occasion the reference format will be "intermediate" and will differ from that at any situs, in which case scan and band conversions take place at all situses.

When transmission originates at the reference situs, the invention prescribes that "frames" be selected periodically, with the time interval between selections depending upon the band compression desired for band conversion and the balance required as to horizontal and vertical resolutions and image continuity. In the interval between successive frame selections, each selected frame is stretched in time. This causes band compression which permits transmission over a channel of reduced bandwidth. As received, the band-compressed signals are expanded in the frequency domain, i.e., compressed in the time domain, to restore them to their original format. The invention also prescribes further time compression to render the vertical and horizontal scan times compatible. Because of aspect ratio considerations, the fully compressed signal is activated for precisely specified lines and during critical horizontal scan times of the co-ordinate format of the receiver. In consequence of the double scale time compression of the invention, one for band expansion and one for scan conversion, the frames of reconstituted pictures are repeated in sequences that depend jointly on the band compression rates and on the scan conversion rates.

The processing of picture signals in a co-ordinate format destined for a reference situs takes place, as taught by the invention, in a fashion converse to that described above. After simultaneous band and scan conversions the selected frames are in a band-compressed reference format so that, at the receiving terminus, repetition of the transmitted signals at only the band expansion rate is necessary.

The invention is further characterized by the use of digital storage networks. This allows rapid and accurate processing of video information, simultaneity of band and scan conversions, and preservation of the distinctive identities of reconstituted picture elements with transmitted picture elements.

Figure 3A:
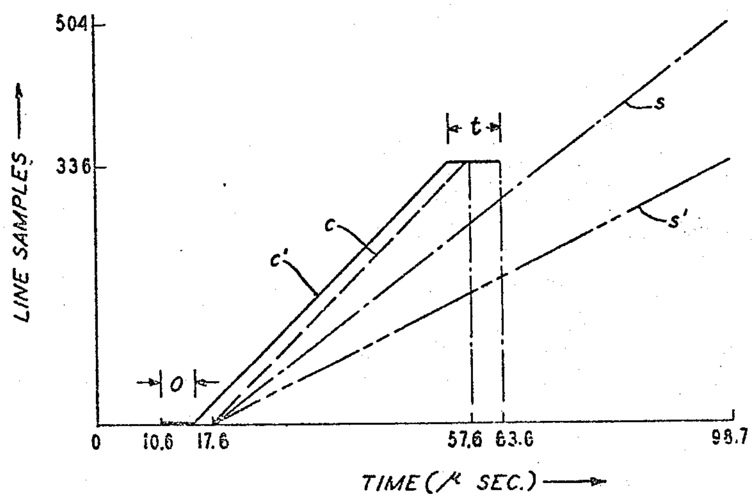
Figure 3B:
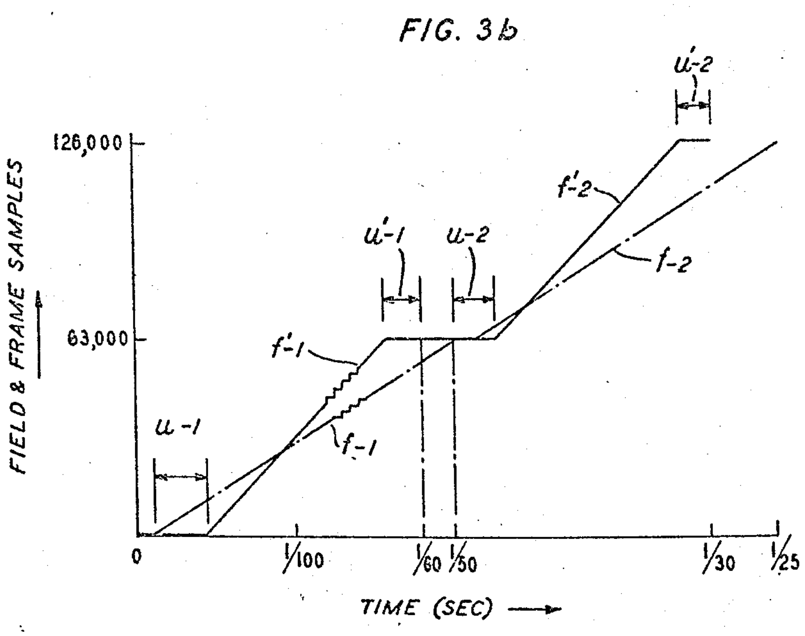
Figure 4A:
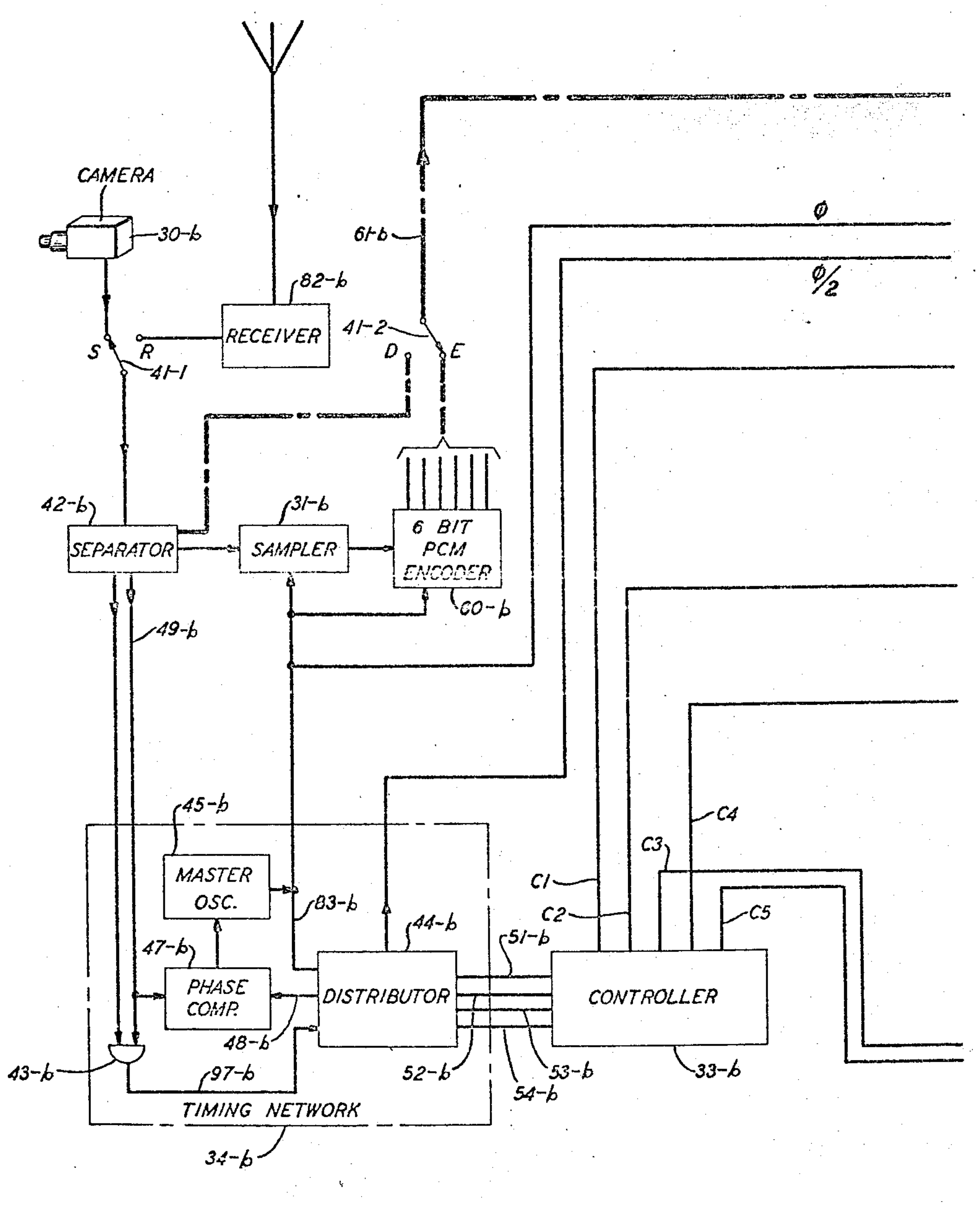
Figure 4B:
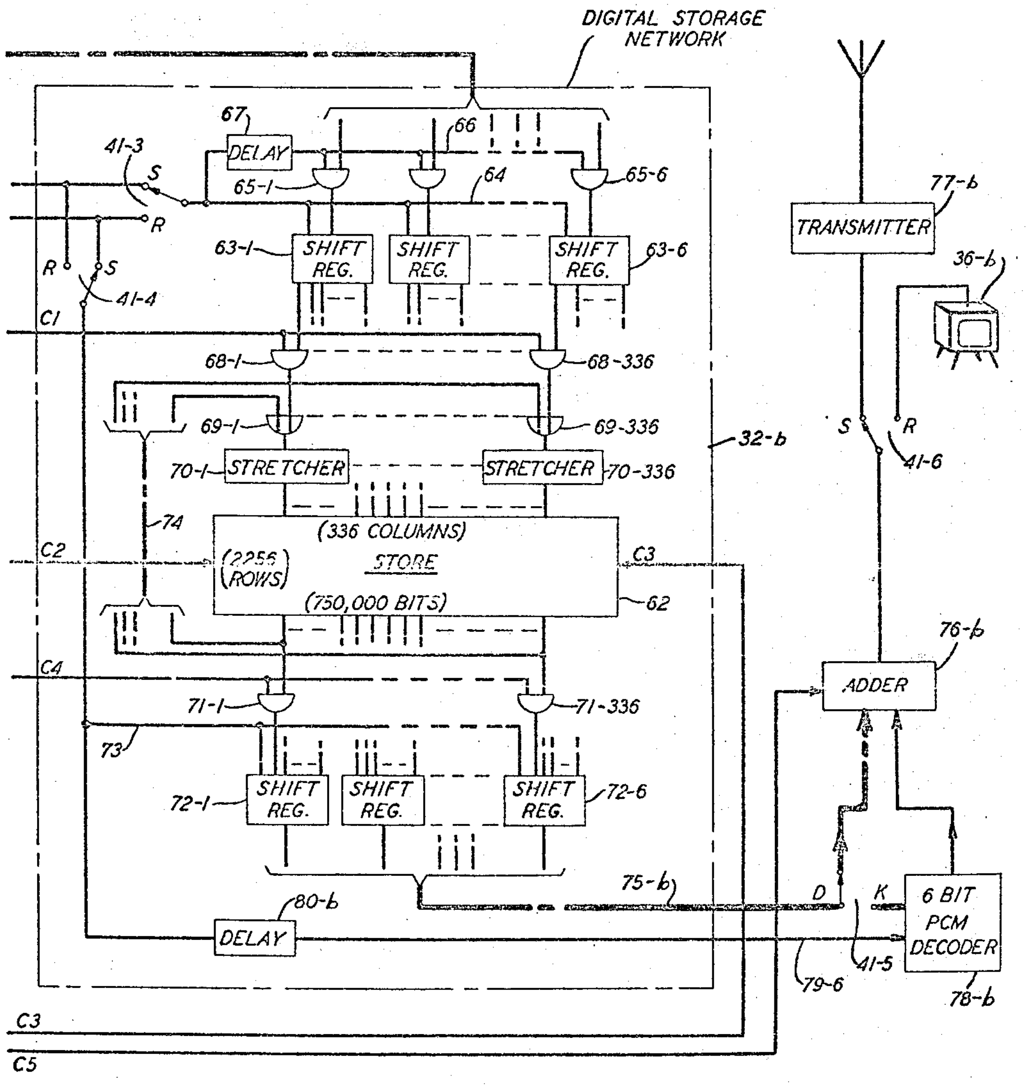
Figure 5A:
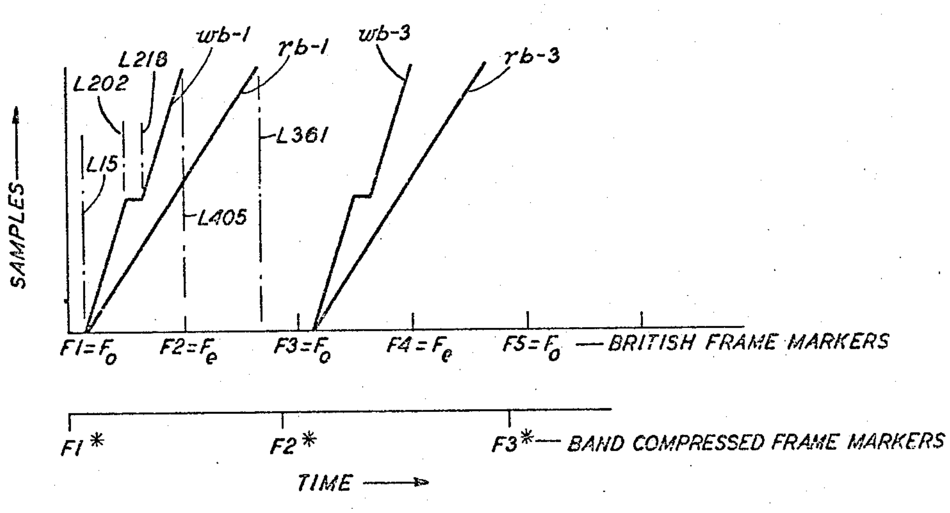
Figure 5B:
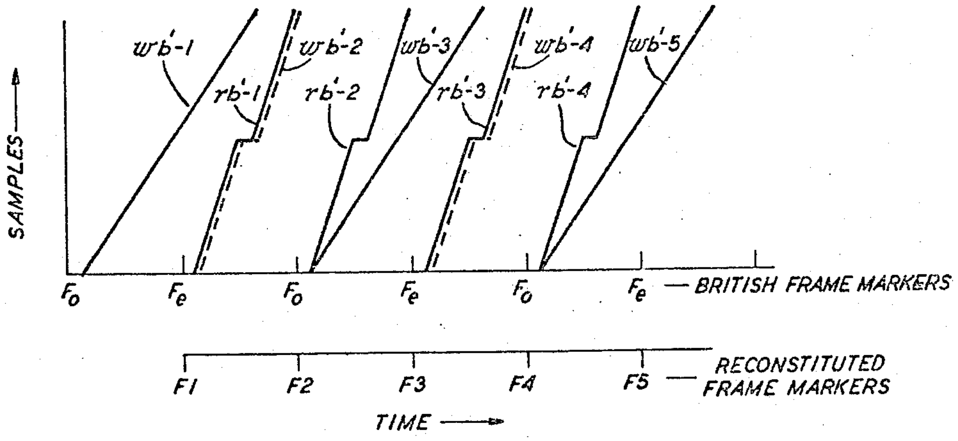
Figure 6B:
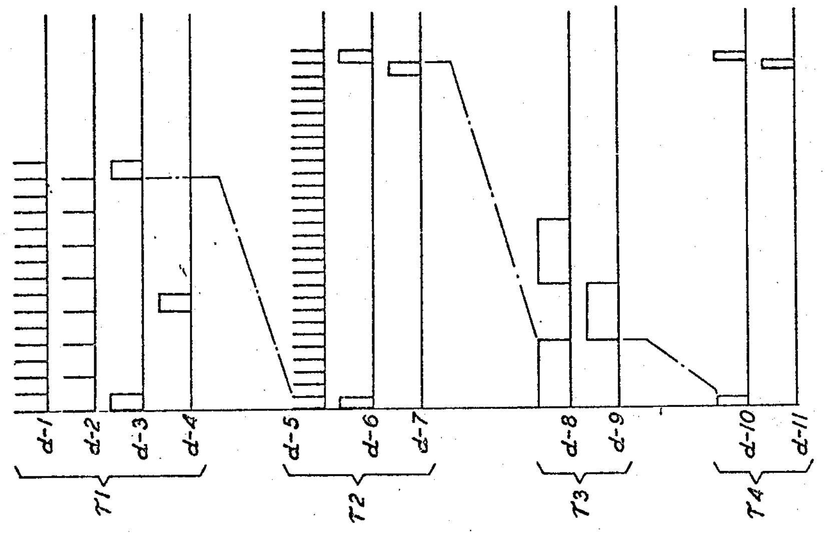
Figure 6A:
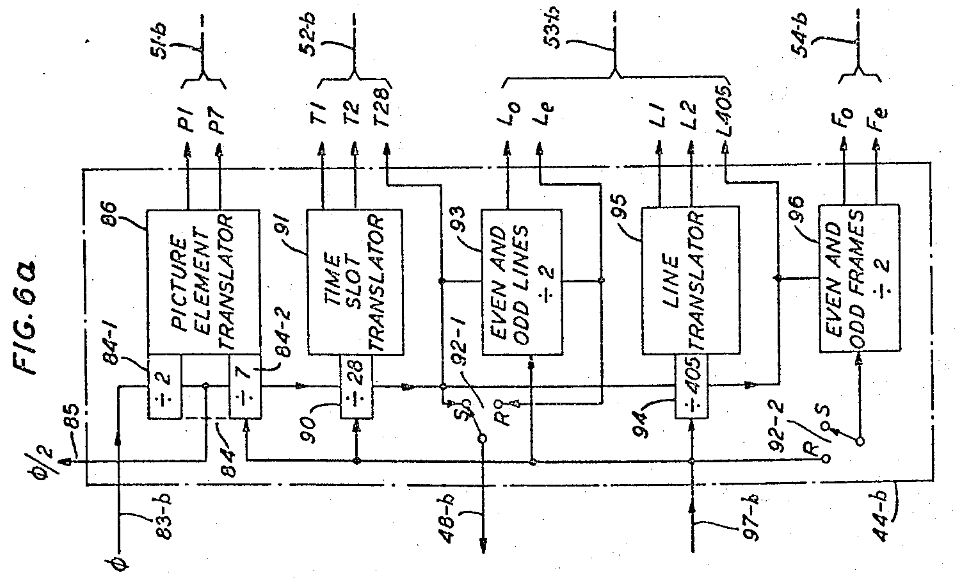
Figure 7A:
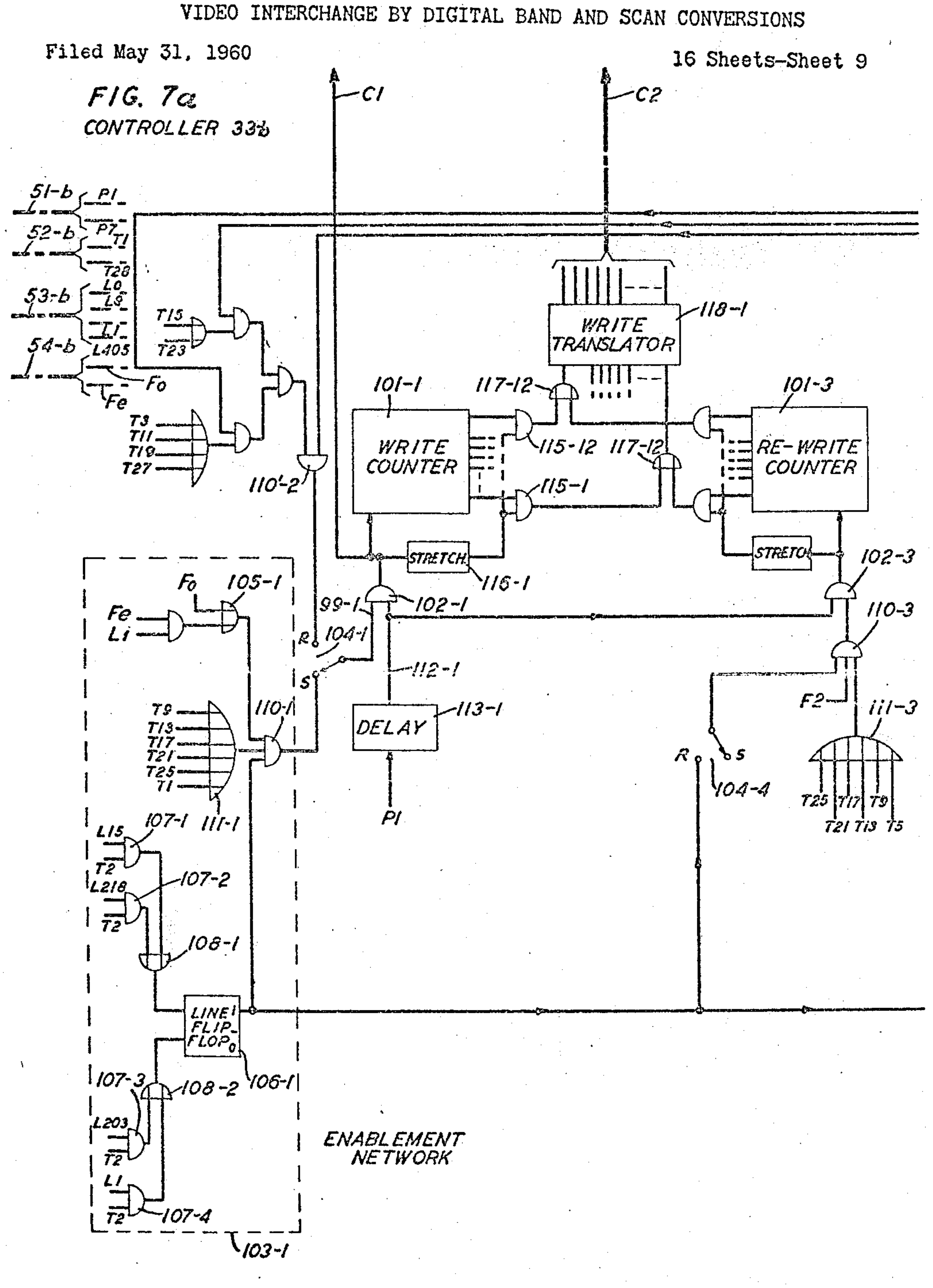
Figure 7B:
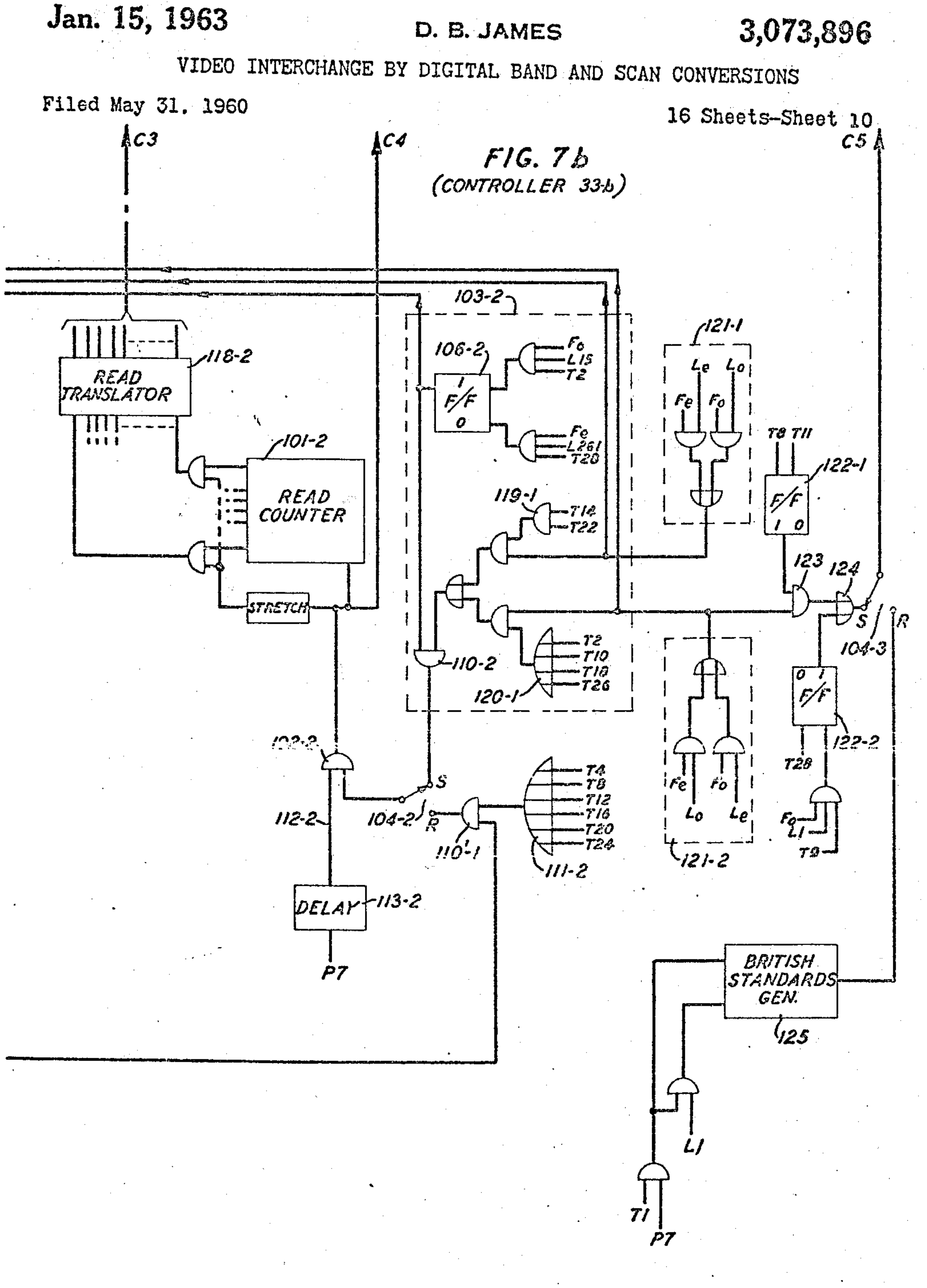
Figure 8A:
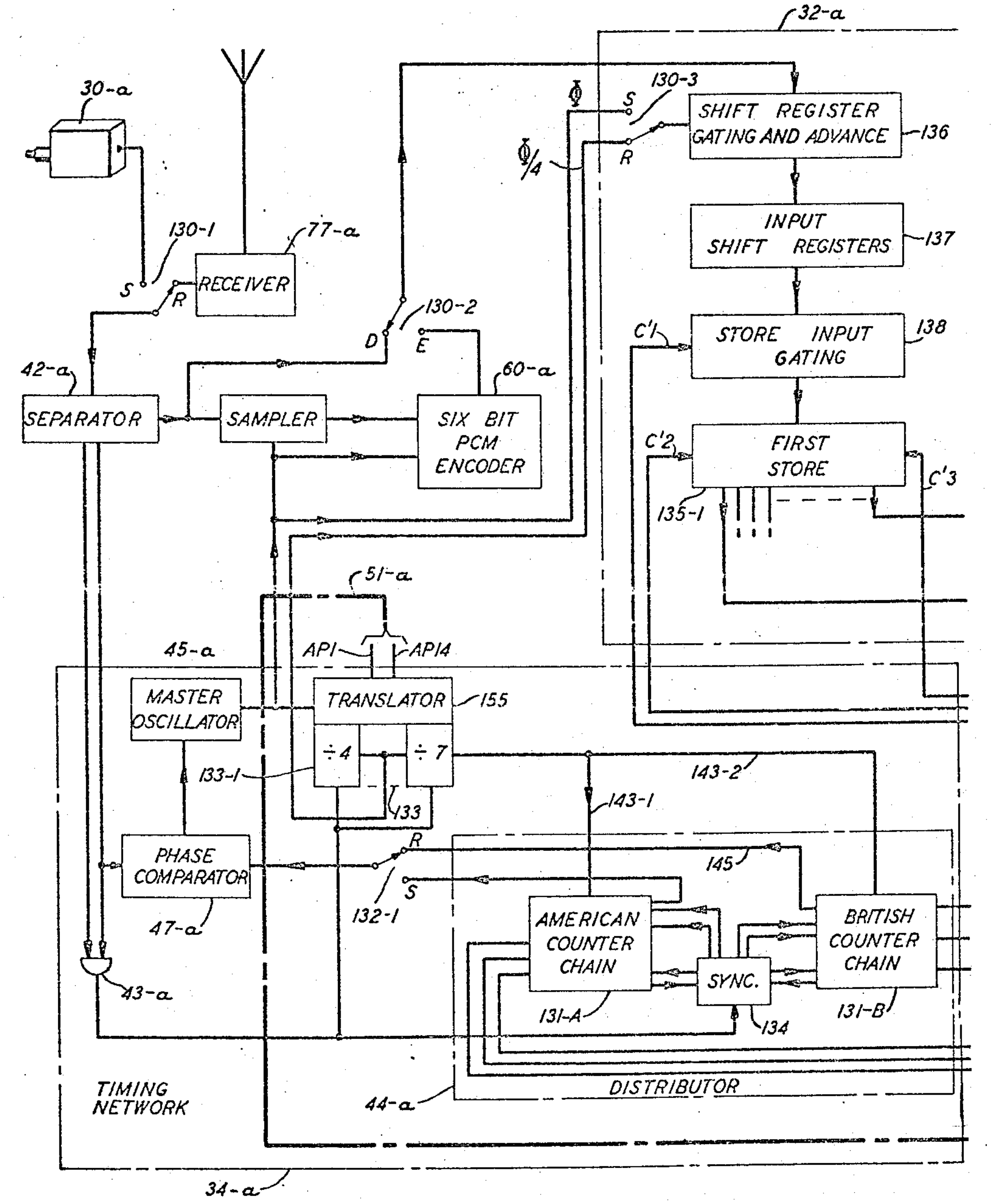
Figure 8B:
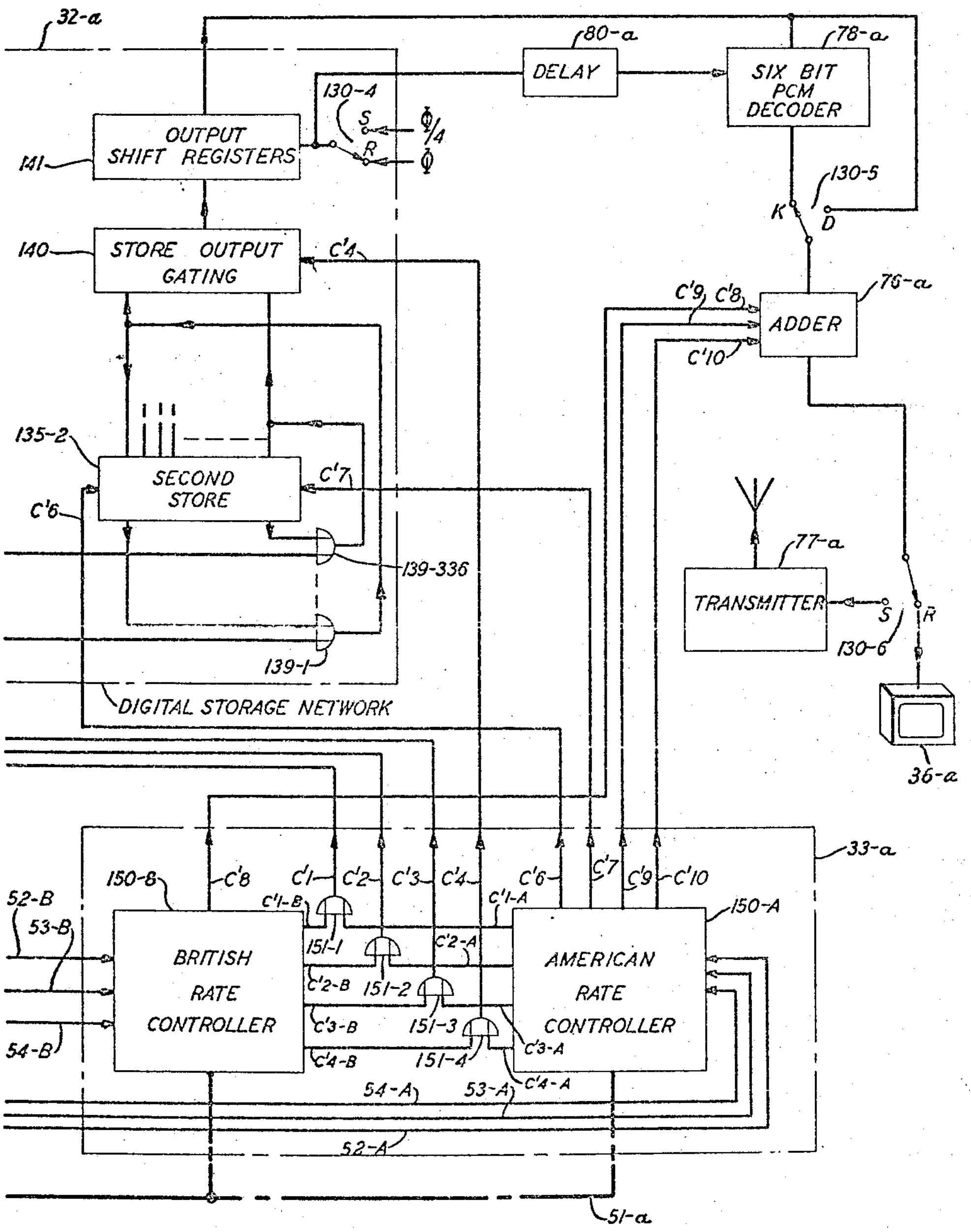
Figure 9A:
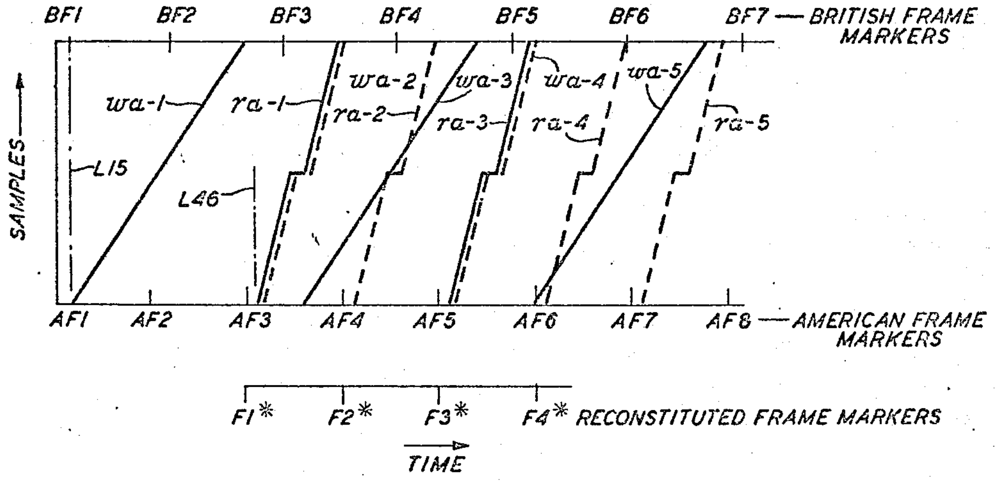
Figure 9B:
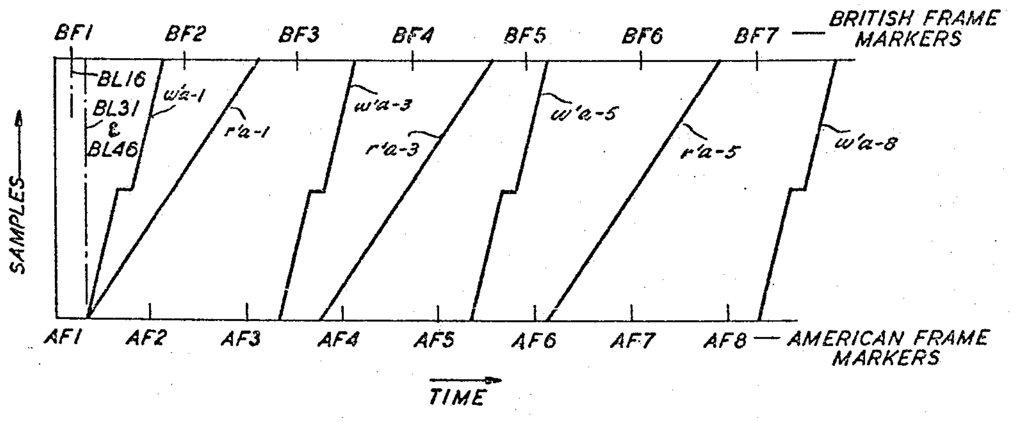
Figure 10:
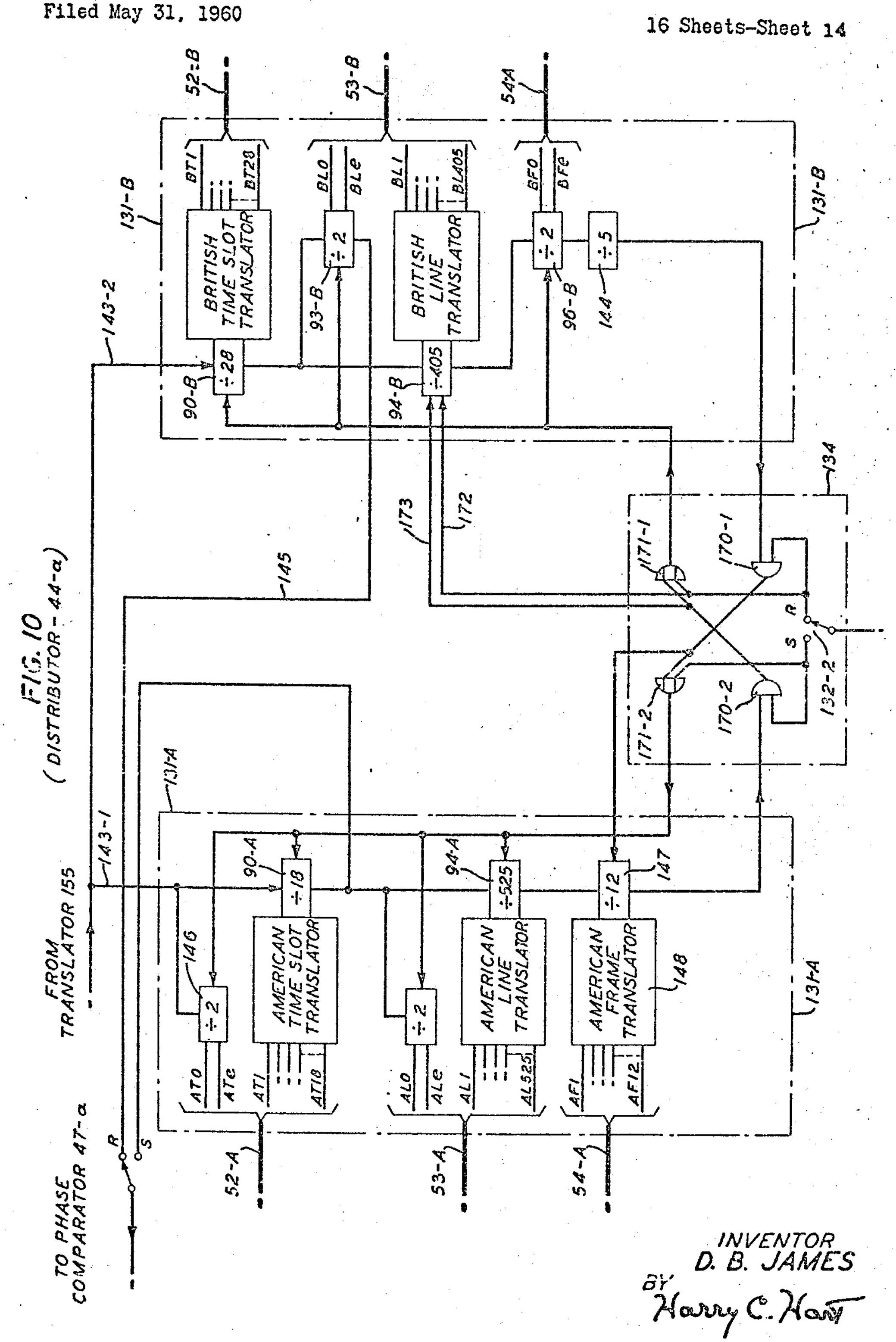
Figure 11A:
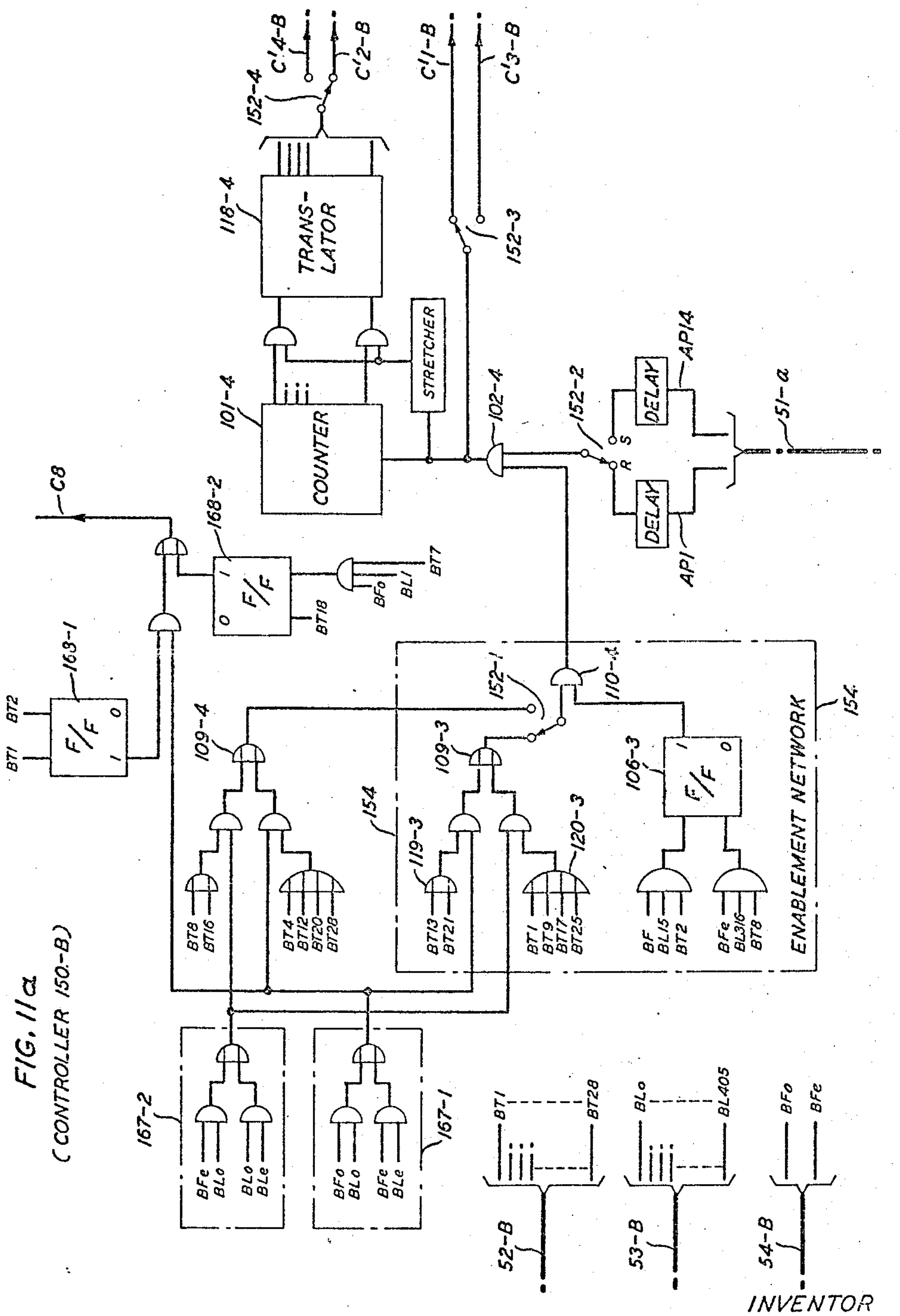
Figure 11B:
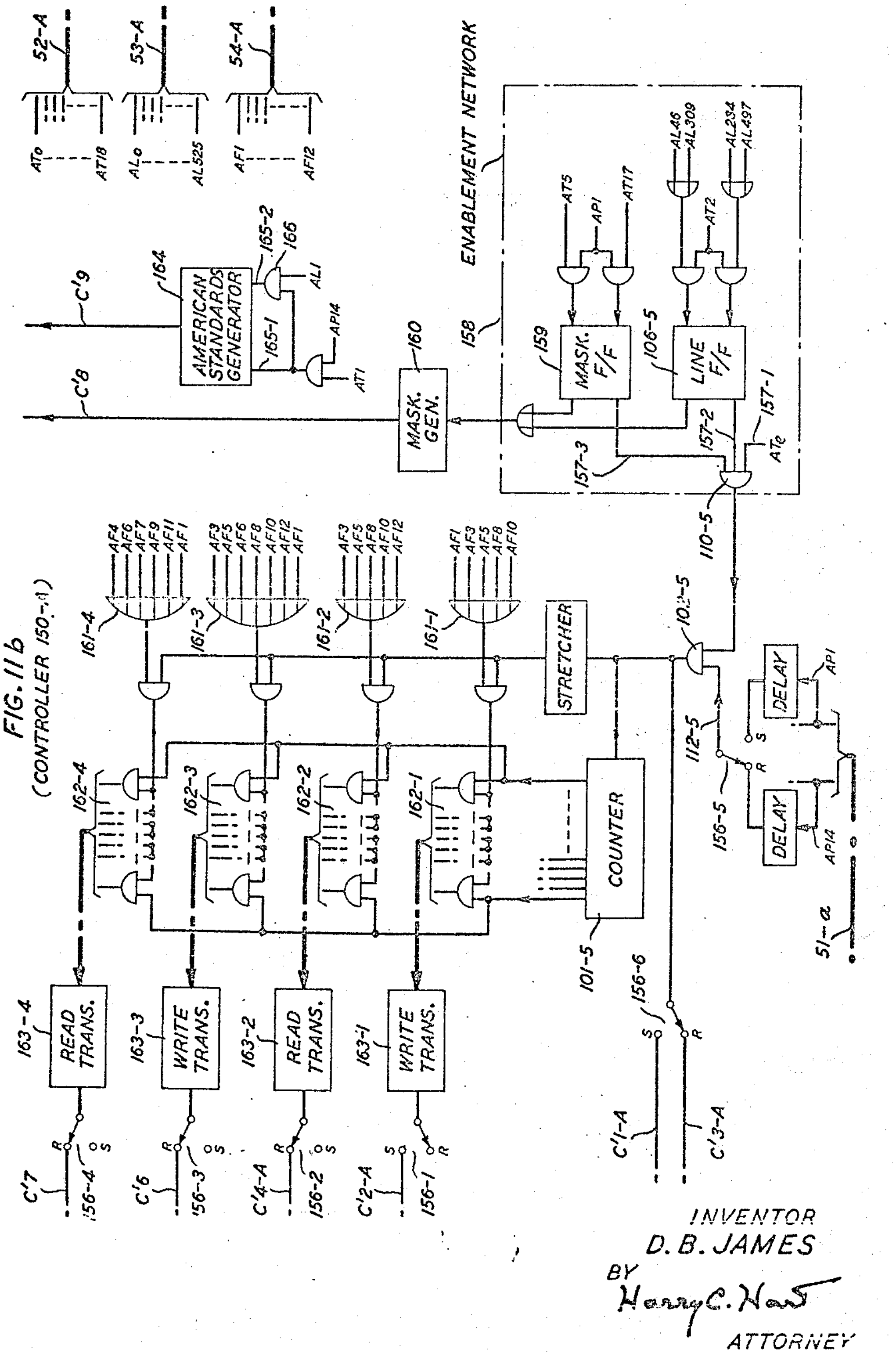

The invention will be fully understood after the consideration of a preferred embodiment thereof taken in conjunction with the drawings, in which:

FIG. 1 is a block diagram of generalized interchangers interconnected by a transmission channel;

FIGS. 2*a* through 2*d* are diagrams demonstrating the format incompatibilities of picture signals to be interchanged;

FIGS. 3*a* and 3*b* are graphs explanatory of scan conversion for lines and frames, respectively;

FIGS. 4*a* and 4*b* are constituent diagrams which together form a block diagram of an interchanger located at a situs where picture signals are generated in a reference format;

FIG. 5*a* is a graph illustrating band compression in the interchanger of FIGS. 4*a* and 5*b*;

FIG. 5*b* is a graph illustrating band expansion in the interchanger of FIGS. 4*a* and 4*b*;

FIG. 6*a* is a block diagram of the distributor used in the interchanger of FIGS. 4*a* and 4*b*;

FIG. 6*b* is a set of diagrams of the timing signals produced by the distributor of FIG. 6*a*;

FIGS. 7*a* and 7*b* are constituent diagrams which together form a block diagram of the controller of FIG. 4*a*;

FIGS. 8*a* and 8*b* are constituent diagrams which together form a block diagram of an interchanger located at a situs where picture signals are generated in a co-ordinate format;

FIG. 9*a* is a graph illustrating band expansion and scan conversion in the interchanger of FIGS. 8*a* and 8*b*;

FIG. 9*b* is a graph illustrating band compression and scan conversion in the interchanger of FIGS. 8*a* and 8*b*;

FIG. 10 is a block diagram of the distributor in the interchanger of FIGS. 8*a* and 8*b*;

FIG. 11*a* is a block diagram of the reference format rate controller used in the interchanger of FIGS. 8*a* and 8*b*; and FIG. 11*b* is a block diagram of the co-ordinate format rate controller used in the interchanger of FIGS. 8*a* and 8*b*.

*General Video Interchange*

Refer now to the block diagram of FIG. 1 in which picture signals in one format, as generated by a video camera 30–*a* at one situs, are interchanged with picture signals in another and different format, as generated by a video camera 30–*b* at another situs.

For transmission, selected sets of the signals formed by samplers 31–*a* and 31–*b* are entered into respective sample storage networks 32–*a* and 32–*b* from whence they are transformed to the format selected as a reference for transmission by the scan converting actions of the controllers 33–*a* and 33–*b* and their timing networks 34–*a* and 34–*b*. Further processing called band conversion and co-ordinated with scan conversion, accommodates the signals to the limited bandwidth of the transmission channel 35.

On reception at either situs local controllers 34–*a* and 34–*b* direct the band and scan conversions in the sample storage networks 32–*a* and 32–*b* and convert the received signals to the formats of the local video reproducers 36–*a* and 36–*b*.

If the samples are to be processed in digital form, they are encoded before being entered into the digital storage networks 32–*a* and 32–*b*. Subsequently, they may be decoded into analog form before transmission, in which case they must be encoded on reception; or they may be transmitted as coded.

*Format Incompatibilities*

Figure 2B:
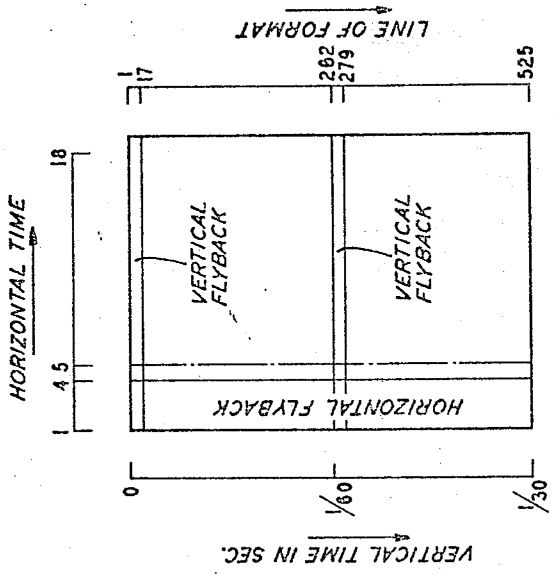
Figure 2A:
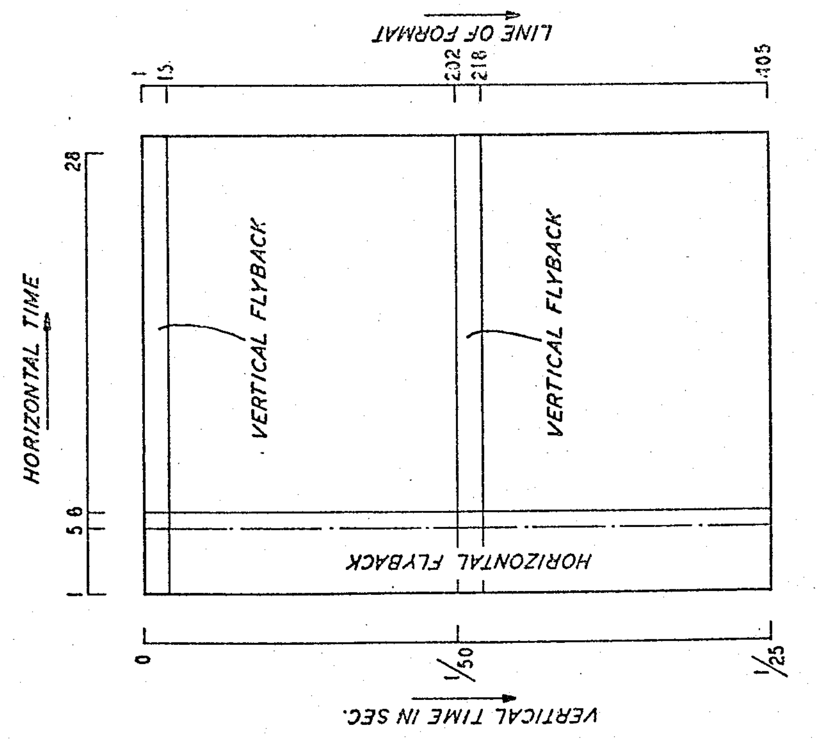

FIGS. 2*a* and 2*b* demonstrate some of the incompatibilities in the time and spatial domains of generated picture signals to be interchanged. For the purposes of illustration British and American formats have been chosen.

In the British format of FIG. 2*a*, 98.7 microseconds are required for each horizontal line scan. This time has been subdivided into twenty-eight equal time intervals, each designated a time slot, for reasons that will become apparent later. The scan begins at time slot 1. For the four time slots which follow, a horizontal flyback signal is produced. At time slot 6 the picture commences and endures until the terminataion of time slot 28. The vertical scan time is $\frac{1}{50}$ of a second for a single field made up of a series of scanned lines individually numbered from 1 through 202. The first fourteen of these lines occur during the vertical flyback period. A second field, interlaced with the first, commences with line 202. Its vertical flyback period extends to line 218, after which successively scanned lines containing picture information appear until the end of line 405. While two interlaced fields make up a frame having a vertical scan time of $\frac{1}{25}$ of a second, as indicated, it is to be understood that the invention does not require the fields to have been derived from the same frame. All that is necessary is that the fields be immediately sequential in time, that is, the "frame" may be composed of field 2 of frame 1 and field 1 of frame 2, well as fields 1 and 2 of the frames as generated.

The corresponding format data for American picture signals are shown in FIG. 2*b*. Since the American horizontal scan time is 63.5 microseconds, it contains eighteen time slots of the kind discussed in conjunction with FIG. 2*a*. The incompatibilities of the two formats are apparent at once. Both flyback times are different as are the numbers of lines, the vertical scan times and the horizontal scan times. It is also apparent that there is a greater line density in the American format than in the British. To further complicate matters, the numbers of picture elements and the bandwidths needed to reproduce them are different in the two cases.

*Band Conversion and the Selection of a Standard for Transmission*

It is well known that wide band signals may be transmitted over the narrow band channel 35 of FIG. 1 by "stretching" them in time. With video signals care is required if reconstructed fields of band-converted signals are to be correctly interlaced. The invention provides for the selection of periodic groups of signals containing sufficient information to constitute a "frame," or a part thereof, in the sense of two fields which are immediately sequential in time. However, this exchange of time for bandwidth in the transmission of picture signals has an adverse effect on image continuity. For example, the three-megacycle British picture signals could be matched to a one-megacycle transmission channel by a band compression in the ratio of three to one. However, such compression would result in excessive jitter since the reconstituted pictures would depict a change of scene only every third frame. More satisfactory image continuity is achieved with the transmission of alternate frames. This, in turn, restricts the bandwidth of the transmitted picture to two megacycles, thus producing an imbalance of the horizontal and vertical resolutions, since the one-to-one correspondence of scan lines, as provided by the invention, maintains the vertical resolution constant. Nevertheless, the human eye is able to tolerate this degree of imbalance.

Figure 2D:
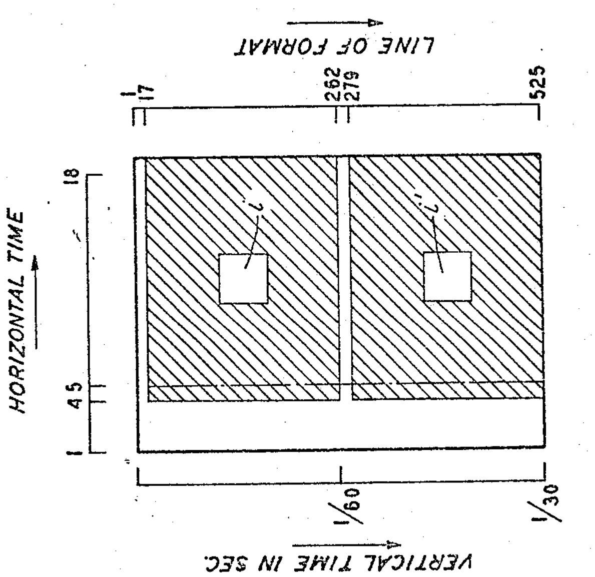

When it is desired to achieve band conversion while maintaining unimpaired resolution, the format for transmission differs from that at any transmission situs. Then the selected groups of signals for transmission comprise but a portion of a "frame." These signals are stretched over the nominal frame time with the result that the picture reconstituted from the received signals is diminished in size, as indicated in FIG. 2*d* by the innermost rectangular areas *i* and *i'* for successive fields, when viewed on a reproducer adapted to the requirements of the local format. Usually, however, resolution considerations are not controlling in the selection of a standard for transmission since a viewer is more likely to be disturbed by changes in image continuity.

For the British format as a reference, in band compression by skipping alternate frames, the frame rate is reduced to 12.5 per second. A higher rate of approximately seventeen frames per second is attainable by skipping every third field in immediately sequential groups of three. In this technique the "frame" identity required by the invention is maintained because there is no impairment of interlace even if one field is chosen from one frame and the second field is chosen from a different field, as long as the selected fields are immediately sequential.

The American format as a reference provides a frame rate of fifteen per second when band compression is achieved by skipping alternate frames. This rate is increased to twenty by the technique of skipping every third field in a group of three.

Assume that the alternate frame technique is chosen for band compression and that a minimum reduction in the reproduced size of the viewed pictures is desired when the transmission bandwidth for analog signals is limited to one megacycle. If the British format is chosen as a standard for transmission, the British picture signals are reduced in bandwidth from three to two megacycles, and the number of active picture elements per line scan is reduced proportionately from about 500 to 330. On the other hand, a reduction of the American bandwidth from four to two megacycles would contract the number of active picture elements per line from about 420 to 210. By virtue of its containing a greater number of picture elements in the reduced bandwidth than its American counterpart, the British format as a reference provides for the interchange of the picture signals with a greater degree of resolution, although with a lesser degree of image continuity. And the only processing required at the British situs is band conversion.

*Scan Conversion*

To understand how the invention copes with the picture element discrepancies of the two formats as well as the vertical and horizontal time incompatibilities, consider the various envelopes of discrete samples versus time for a single line scan, as shown in FIG. 3*a*. The picture elements themselves are a measure of the fineness of detail portrayable in a horizontal line scan, increased spatial density being accompanied by increased sharpness. These picture elements may be alternatively considered as discrete samples at regularly spaced time intervals. The envelope *s* for a standard British line contains 504 picture elements. If these are to be displayed in the standard active scan time of about eighty-one microseconds, a three-megacycle bandwidth is required.

When the British bandwidth is reduced to two megacycles, the number of samples is reduced proportionately. As with the standard scan *s*, the first sample of the British band-limited scan *s'* occurs after 17.6 microseconds, or five time slots. Eighty-one microseconds later, or by the end of the scan, 336 of the samples have been displayed.

The American scan time, on the other hand, is shorter than the British in two respects. Its active portion that follows blanking commences at 10.6 microseconds, and all active picture elements have been displayed by 63.6 microseconds. Scan conversion requires the fitting of the 336 picture elements that occur during the eighty-one microsecond interval of the band-limited British scan into the fifty-three microsecond interval of the active American scan time. This could be done by increasing the rate of the British scan in the ratio of eighty-one to fifty-three. However, such a rate could not preserve the aspect ratio of the reproduced picture given the one-to-one correspondence of lines required by the invention. Since the respective numbers of active lines, i.e., those viewed on the screens of reproducers, in the British and American formats are 376 and 498, the American scan time during which the British picture elements are displayed must be reduced by a factor that is the ratio of the numbers of lines, making the display time approximately forty microseconds for the British picture elements transformed into the American format, as demonstrated by the converted scan envelope *c* of FIG. 3*a*.

The figures for the British and American scan times given above are the result of averaging the limiting values encountered in practice. For example, the active British scan varies between 80.2 and 82.7 microseconds. A similar variation between 39.2 and 40.4 microseconds is found in the American scan as modified to preserve aspect ratio. Consequently, to a close approximation scan conversion of the band-limited British picture elements may be accomplished by reproducing them as received in the United States at a doubled rate.

Since the converted British line *c* which preserves aspect ratio cannot occupy the entire interval from 10.6 to 63.6 microseconds over which American scan lines are generated, it is necessary to provide in FIG. 3*a* an opening mask *o* at the beginning and a terminal mask *t* at the end of the line. The opening mask *o* conveniently endures for about 5.5 microseconds, while the terminal mask *t* occupies the interval between the appearance of the 336th British picture element and the end of the American line scan, or about seven microseconds. Such a British line would appear in the American format scan as illustrated in FIG. 3*a* by the reconstituted scan envelope *c'* and in FIG. 2*c* by typical line 100 of the British picture seen in the United States. When an American line is converted to the British format, the American samples occurring during the mask interval are discarded, and the converted American line completely occupies the British picture scan period.

Figure 2C:
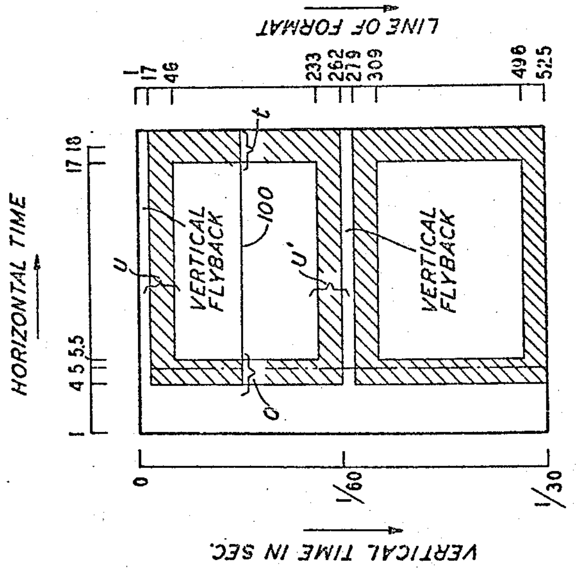

The matching of lines prescribed by the invention makes upper and under field masking *u* and *u'*, as shown in FIG. 2*c*, necessary in consequence of there being a greater number of lines in the American format than in the British.

The effect of scan conversion in the time domain is illustrated for two successive fields by the staircase envelopes of FIG. 3*b*. The first picture element of the reduced bandwidth British field *f*–1 begins to appear after 1.4 milliseconds, and at the end of twenty milliseconds the total number of generated picture elements is approximately 63,000. Two fields *f*–1 and *f*–2 form a frame, and the horizontal portions of the envelopes and of the staircases account for the blanking times during which no samples are displayed.

Doubling the scan rate of the reduced bandwidth British fields *f*–1 and *f*–2, combined with opening and terminal line masking, provides scan converted fields *f'*–1 and *f'*–2. The upper and under field maskings *u*–1, *u*–2 and *u'*–1 and *u'*–2 of FIG. 3*b* are needed because of the format line disparities. The result is a masking rim surrounding the entire reconstituted field of FIG. 2*c*.

When an American frame is transformed into the British format, picture element signals present in the masking region are discarded and the reconstituted frames occupy the entire viewing screen of British reproducers.

Since scan conversion entails a change in the rate of information processing, storage is needed to handle accumulations caused by rate difference. Band conversion also requires a change in the rate of information processing, and this function is readily co-ordinated with scan conversion by appropriate control of the storage unit employed. For example, when the picture signals of alternate British frames are selected for band conversion, the picture elements received in the United States are reproduced at a quadrupled rate, there being one factor of two for scan conversion and another factor of two for band conversion.

*Processing at a Reference Situs for Transmission to a Co-Ordinate Situs*

Assume that the British format is chosen as the transmission reference for the interchange, over a one-megacycle analog channel or a twelve-megacycle digital channel, of picture signals required to have an image continuity of 12.5 frames per second.

In keeping with the invention the only conversion need for transmission from the reference situs in Great Britain is band compression. Since speed is of the essence, this is accomplished in the digital interchanger of FIGS. 4*a* and 4*b*. A local camera 30–*b* (FIG. 4*a*) monitors a video scene in the conventional fashion. The picture information sensed by the camera 30–*b* is sent through a first selector switch 41–1, set in its "send" position S, to a separator 42–*b* which partitions the synchronizing pulses and the superimposed picture information.

The separator 42–*b* is designed to pass synchronizing pulses of two varieties. For horizontal synchronization pulses of the first variety recur at the British line rate of 10,125 cycles per second on the line synchronization lead 49–*b*. In addition, broader pulses of the second variety appear fifty times per second, and alternate ones of these are selected as frame pulses.

The simultaneous presence of the line and the frame pulses, marking the beginning of a frame, is recognized by a timing AND gate 43–*b* which sends a reset signal to the distributor 44–*b* of the timing network 34–*b*. The distributor 44–*b*, considered subsequently in greater detail, is driven by a master oscillator 45–*b*. It is essentially an extended chain of binary counters and associated translators which provide various timing signals at the diverse rates needed throughout the interchanger network. Timing signals recurring at picture element, time slot, line and frame rates are sent by respective bundles 51–*b*, 52–*b*, 53–*b* and 54–*b* of leads to the controller 33–*b* where system co-ordination takes place. The detailed operation of the controller 33–*b* is considered in a subsequent section.

To assure synchronization of the timing network 34–*b* with the incoming signal, the phasing of the master oscillator 45–*b* is controlled by an error signal derived from a phase comparator 47–*b* which collates the times of occurrence of the line synchronization pulses and corresponding pulses of like frequency derived from the oscillator 45–*b*. The image continuity specification of 12.5 frames per second, coupled with the limitation of the transmission channel bandwidth to one megacycle for analog transmission or twelve megacycles for digital transmission, mandates a reduction in the bandwidth of the incoming British picture information from three to two megacycles before band compression can take place. This requires a sampling rate of four megacycles which establishes the frequency of the oscillator 45–*b*. Accordingly, a countdown of approximately 400 is needed if the output on the distributor lead 48–*b* connected to the phase comparator 47–*b* is to be of the same frequency as the signal appearing on the line synchronization lead 49–*b*. The error sensitivity of the oscillator is adjusted to take the high order countdown in its feedback path into account.

The video information partitioned from the synchronizing pulses by the separator 42–*b* is sampled in a sampler 31–*b* operating at the oscillator basic rate. Each sampled amplitude is translated into six-bit pulse code modulation by conventional flash coding in an encoder 60–*b*, also operating at the sampling rate. Consequently, the output of the encoder 60–*b* for each sample comprises six bits, available simultaneously on respective ones of six leads forming a bundle 61–*b* that conveys the coded video signals through a second selector switch 41–2, set in its "encode" position E, to a digital storage network 32–*b* (FIG. 4).

The central component of the digital storage network 32–*b* is a store 62 made up of an array of magnetic wire memory elements, arranged in a matrix of 336 columns and 2,256 rows so that it may accommodate the over 758,000 bits required for one frame of a British signal sampled at a two-megacycle rate. The operation and structure of this kind of store is described in the copending application of A. H. Bobeck, Serial No. 675,522, filed August 1, 1957. It is of the coincident current variety requiring half-amplitude pulses applied to the columns and to each row that is to be written in. A full-amplitude pulse is applied to each row that is to be read out.

The output from the encoder 60–*b* (FIG. 4*a*) enters this store 62 (FIG. 4*b*) by way of six individual input shift registers 63–1 to 63–6 (FIG. 4*b*), each having a capacity of fifty-six bits, there being one register for each of the six bits forming a sample. Pulses $\varphi$ at the sampling rate and derived from the master oscillator 45–*b* (FIG. 4*a*) enter the shift register input advance lead 64 through a third selector switch 41–3 set in its "send" position S. Each such pulse $\varphi$ causes the digital information present in each register 63–1 to 63–6 to be shifted to a subsequent serial position. Access of the respective code bits to the shift registers 63–1 to 63–6 is provided by six register input AND gates 65–1 to 65–6 to which the individual bits are applied in conjunction with an input gating sampling pulse that is given a time lag as it passes from the input advance lead to the input gating lead 66 through a delay line 67. The gating delay is chosen to compensate for the encoding time and to avoid interference with the pulses, at the same frequency, applied to the input advance lead 64. The delay is conveniently one-half of the interval between repetitions of the sampling pulses $\varphi$ with the result that information stored in a particular row of the memory, in the first column position, lags its reception at the interchanger by ⅛ of a microsecond, or approximately 1/32 of a time slot of the kind shown in FIG. 2*a*.

After four time slots each register 63–1 to 63–6 has accumulated fifty-six bits present in ⅙ of the active part of the line scan, i.e., 1/7 of the entire line, so that the 336 bits of fifty-six picture elements can be entered simultaneously into one of the rows of the store 62. A pulse derived from the controller traverses the input controller gating lead C1 to energize respective ones of the 336 register output AND gates 68–1 to 68–336 connected to the shift registers 63–1 to 63–6. The individual AND gate signals pass through respective store OR gates 69–1 to 69–336 and are shaped in respective stretchers 70–1 to 70–336 to half-height pulses of sufficient duration to satisfy the writing time of the store 62. These latter pulses co-operate with the half-height pulses from the controller 33–*b* appearing on successive leads forming the store writing bundle C2 to enter the information into the store 62. Since there are 376 active lines in a frame and six rows are required per line, the bundle C2 contains 2,256 leads.

It is seen that the operations of the store 62 are controlled on a line and time slot basis. The duration of each time slot is such as to be integrally divisible into the horizontal scan times of both formats and to be compatible with the store chosen. Since the British horizontal line rate is 10,125 cycles per second and the American line rate is 15,750 cycles per second, the lowest common multiple for these two rates is 141.75 kilocycles. When this is considered in conjunction with the conversion requirement that information be read shortly after it is written, provision must be made for a doubled number of the slots. This allows the writing to take place during the odd time intervals and the reading to occur during even time intervals. As a result the time slot rate is twice that of the lowest common multiple of the incompatible line rates, making the time slot time interval 3.525 microseconds. This is compatible with the reading and writing times of the store chosen, for which writing requires four microseconds and reading requires one microsecond. If the writing function is performed at the beginning of odd time slots and reading is performed near the middle of even time slots, the reading and writing operations will require no more than the allotted two time slots, while allowing a guard space of one microsecond between each operation.

The nature of the storage operation is more clearly demonstrated by reference to the graphs of FIG. 5*a* showing the relationship between the storage of samples and the transitions in frame identity that take place during band compression. The first abscissal time scale is provided with periodic markers $E_o$ to indicate the commencement of the odd frames that enter the store 62. Even numbered frames that are not stored commence at times marked $F_e$. The second abcissal time scale is provided with asterisked frame markers to identify the commencement of band-compressed frames leaving the store 62.

The writing of the selected frames, i.e., the odd ones, is delayed until the time of line 15 since, as shown in FIG. 2*a*, the first fourteen lines of each frame are devoted to vertical flyback. Thereafter, as indicated in FIG. 5*a* by successive writing graphs *wb*–1 and *wb*-3, the discrete samples of successive lines are entered into storage until the time of line 203. During the vertical flyback interval which follows, there is a fourteen-line pause. Writing recommences with the time of line 218 and terminates with the time of line 405.

Shortly after being written, as portrayed by the reading graphs *rb*–1 and *rb*–3 of FIG. 5*a*, the stored information is read at a rate one-half of that used for writing. Because no pause is needed for vertical flyback, reading is completed at the time that line 361 of each even frame $F_e$ normally occurs.

To accomplish reading, full-height pulses from the controller 33–*b* are applied to successive leads of the store reading bundle C3 in FIG. 4*a*. Each pulse causes the 336 bits of fifty-six samples stored in a particular row to be present at respective ones of the 336 register output AND gates 71–1 through 71–336 (FIG. 4*b*). Simultaneously, a pulse appears on the controller output gating lead C4, allowing parallel entry of the bits into the six output shift registers 72–1 through 72–6. The bits leave the registers 72–1 through 72–6, six at a time per sample, along individual ones of leads forming an output bundle 75–*b* in response to pulses at one-half the sampling rate on the output register advance lead 73. Each half-rate pulse $\phi/2$ is obtained from the distributor 44–*b* (FIG. 4*a*) by way of a fourth selector switch 41–4 (FIG. 4*b*) set in its "send" position S. The half rate needed for band compression demonstrated in FIG. 5*a* is thus seen to operate at two levels. First, the rate of pulses on leads of the store-reading bundle C3 determines the spacing, in time, of groups of samples, and, second, the pulse rate on the output advance lead 73 controls the spacing, in time, of the discrete samples within each group.

The band-compressed and coded video information is sent directly through a fifth selector switch 41–5 (FIG. 4*b*), set in the "direct" position D, to an adder 76–*b* where it is combined with synchronizing pulses, at one-half the input rate, obtained from the controller 33–*b* (FIG. 4*a*) through its synchronizing lead C5. Transmission is by way of a conventional transmitter 77–*b* (FIG. 4*b*) which may use the converted signals to frequency modulate or amplitude modulate an appropriate carrier.

Alternatively, the coded video information may be decoded preparatory to the addition of synchronizing pulses and subsequent transmission. The fifth selector switch 41–5 is set to its "decode" position K and the decoder 78–*b* is actuated through its operating lead 79–*b* by half-rate pulses $\phi/2$ given a time lag by a delay line 80–*b* to match the delays introduced in the prior processing.

*Distributor at the Reference Situs*

The distributor 44–*b* furnishing the timing signals for the store 62 and the controller 33–*b* of FIG. 4*a* is shown in greater detail in FIG. 6*a*. A corresponding sequence of timing diagrams is set forth in FIG. 6*b*.

A train of pulses $\phi$ at the sampling rate, illustrated by the full-rate diagram *d*–1 of FIG. 6*b*, arrives from the master oscillator 45–*b* over the distributor input lead 83–*b* in FIG. 6*a*. These full-rate pulses $\phi$ directly enter a picture element binary counter 84 whose first stage 84–1 produces a division by two to provide, on the half-rate lead 85, pulses $\phi/2$ of the half-rate diagram *d*–2 of FIG. 6*b*. With a second, internally reset binary counter stage 84–2 giving a further division by seven, the output of the picture element counter 84 is at the rate of the British time slots in FIG. 2*a*. The precise occurrence of selected ones of the picture elements is identified by the use of a picture element translator 86 which converts the binary outputs of the picture element counter stages to a decimal code permutation. Two members of the permutation appear on leads designated P1 and P7. The signal on the first of these leads P1, illustrated by the first picture element diagram *d*–3 with a first time scale $\tau 1$ in FIG. 6*b* establishes the time position of the first picture element in each time slot. It is in phase coincidence with the leading pulse of the full-rate diagram *d*–1. After fourteen full-rate pulse times, the signal for the first picture element reappears. A similar sequence of pulses, aside from a delay of six full-rate pulse times, shown by the second picture element diagram *d*–4 of FIG. 6*b*, is present on the other lead P7, which with lead P1 forms the picture element bundle 51–*b* extending to the controller 33–*b* of FIG. 4*a*.

Identification of the distinct time slots encountered in the full scan of a British line requires a time slot binary counter 90 that attains a count of twenty-eight before being reset internally. The associated translator 91 has twenty-eight individual output leads T1 through T28 forming a time slot bundle 52–*b*. The first and twenty-eighth time slot signals are given by time slot diagrams *d*–6 and *d*–7 in FIG. 6*b* with a time scale contraction of twenty-eight as compared with the picture element diagrams, of which that for the fourteenth picture element signal is set forth in diagram *d*–5 with the contracted scale $\tau 2$.

The output of the time slot counter 90 is at the same frequency as the line synchronization pulses derived from the separator 42–*b* of FIG. 4*a*. This output is supplied to the distributor output lead 48–*b* through a first distributor selector switch 92 set in its "send" position S.

Being at the line rate, the time slot output is further applied to two line counters 93 and 94. The first of these is an auxiliary binary counter 93 that provides on leads $L_o$ and $L_e$ identification of odd and even lines whose rate patterns *d*–8 and *d*–9 are indicated in FIG. 6*b* with a time scale $\tau 3$ of 1/8 of that $\tau 2$ used for the time slot diagram *d*–5 through *d*–7. The second line counter 94 makes available a full count of 405 lines through its related translator 95. Further compression in FIG. 6*b* of the even and odd line time scale $\tau 3$ to a full line time scale $\tau 4$ has been made for the diagrams *d*–10 and *d*–11 showing the recurrent pulse patterns available on the first and last leads L1 and L405 of the 405 leads of the line translator 95. The leads $L_o$ and $L_e$ and L1 through L405 from the auxiliary counter 93 and the line translator 95 form a line bundle 53–*b*.

To distinguish between odd and even frames, the output of the second line counter 94 is applied to a frame counter 96 which terminates the countdown chain of the British distributor 44–*b*. The pair of leads $F_o$ and $F_e$ from the frame counter 96 forms a frame bundle 54–*b*.

Synchronization of the countdown chain is effected by a signal derived from the timing AND gate 43–*b* in the timing network 34–*b* of FIG. 4*a*. With the simultaneous occurrence of frame and line pulses all counters, except the one indicative of odd and even frames, are reset to their zero count positions through branch connections to the main reset lead 97–*b*. This reset is in addition to the internal reset for each counter made necessary by the characteristic of binary counters in attaining a maximum count which is defined by the numeral two raised to the power of the number stages in the counter.

*Operation of the Controller at the Reference Situs During Transmission*

The timing signals generated by the distributor 44–*b* of FIG. 6*a* are applied directly to the controller 33–*b* of FIGS. 7*a* and 7*b*. Respective ones of the leads in the bundles 51–*b*, 52–*b*, 53–*b* and 54–*b* extending from the distributor 44–*b* are connected to the various OR and AND gates of the controller 33–*b*. These leads are marked P, F, L and T at the controller to indicate picture element, frame, line and time slot connections, respectively. The numerical suffixes and the literal subscripts identify particular connections to the distributor 44–*b* of FIG. 6*a*.

As noted in conjunction with the discusion of the digital storage network 32–*b* of FIG. 4*b*, during transmission successive groups of 336 bits, furnished by fifty-six samples, are entered into the store 62 in successive rows. The particular row is prescribed by the response of the write counter 101–1 of FIG. 7*a* to the regulated recurrence of pulses from a writing control AND gate 102–1.

The enablement terminal 99–1 of the AND gate 102–1 is connected to a writing enablement network 103–1 through a first controller selector switch 104–1 set in its "send" position S. Pulses from the enablement network 103–1 originate at specified times of active scan lines during odd frames that are sensed by markers at a frame OR gate 105–1. The line sequence is regulated by a line flip flop 106–1 according to the format of FIG. 2*a* and the writing graphs *wb*–1 and *wb*–3 of FIG. 5*a*. With timing signals on leads T2 and L15 at time slot 2 of line 15, the first line AND gate 107–1 sets the flip flop 106–1 through a first intervening OR gate 108–1. Although picture information is not available until time slot 6 (see FIG. 2*a*), this early activation is required to place the co-ordinator AND gate 110–1 in its ready condition to receive a signal from the time slot OR gate 111–1, whose initial operation per line through lead T9 is delayed until time slot 9 to account for the four time slot interval between entry and complete accumulation of bits in the shift registers 63–1 through 63–6 of FIG. 4*b*.

With the appearance of a signal level on the enablement terminal 99–1 of the writing control AND gate 102–1, a coincident pulse on the writing control lead 112–1 triggers the counter 101–1, causing it to change state and register its first count. The control lead pulse is delayed in a delay line 113–1 to compensate for circuit time lags. Being obtained from the first lead P1 of the picture element translator, the pulse accurately identifies the beginning of each time slot containing it.

Every fourth time slot, as indicated by successive inputs, e.g., T13 and T17 of the time slot OR gate 111–1, the write counter 101–1 changes state. However, the bits of the terminal picture element of a scanned line enter the shift registers 63–1 through 63–6 in FIG. 4*b* during the close of time slot 28 so that the final enablement on lead T1 is scheduled for the time slot 1 of the succeeding line. At the end of an odd frame the succeeding line is in an even frame. Consequently, provision is made for the enablement of the frame OR gate 105–1 on leads L1 and $F_e$ during the first line of each even frame. Further counting during that frame, when no storage is needed, is prevented by the concerted actions of signals on leads L1 and T2 and representative of line 1 and time slot 2 at the fourth line AND gate 107–4 which reset the line flip flop 106–1 through a second intervening OR gate 108–2. This disables the enablement network 103–1 for the remainder of the even frame.

It will be recalled from the graphs *wb*–1 and *wb*–3 of FIG. 5*a* that no information is stored during the vertical flyback time occurring between fields. The necessary disconnection is effected by signals on leads L203 and T2 for line 203 and time slot 2 at the third line AND gate 107–3 which reset the line flip flop 106–1 through the second OR gate 108–2. When the flyback interval has terminated, the counter is reactivated through the agency of signals on leads L218 and T2 representing line 218 and time slot 2 at the second line AND gate 107–2.

With each enablement a signal is created on the controller input gating lead C1, connected to the store 62 of FIG. 4*b*, as well as at the output of each counter stage. The latter signals are voltage levels that endure beyond the time during which writing is to occur. They are applied to twelve successive counter AND gates 115–1 through 115–12 in conjunction with the output of the writing control AND gate 102–1, as expanded by a stretching network 116–1 over the time interval required for writing.

Since the store 62 of FIG. 4*b* contains 2,256 rows, the write counter 101–1 of FIG. 7*a* is provided with twelve stages and an internal reset. Passing through translator OR gates 117–1 through 117–12 the stretched pulses from the counter AND gates 115–1 through 115–12 enter a write translator 118–1, similar to any one of those used in the distributor 44–*b* of FIG. 6*a*, where the binary representation of the counter 101–1 is converted to a decimal code permutation that appears on successive leads forming the store writing bundle C2. The rewrite counter 101–3 which is also coupled to the write translator 118–1 is operative only when information received from another situs is being processed.

As indicated by the graphs *rb*–1 and *rb*–3 of FIG. 5*a*, the reading of the store 62 in FIG. 4*a* begins shortly after the writing has commenced. And the logic circuitry employed in FIG. 7*b* is comparable with that used in FIG. 7*a* for writing with modifications designed to expand the reading over two frame times.

In the reading enablement network 103–2 of FIG. 7*b* line flip flop 106–2 is set on leads T2, L15 and $F_o$ at time slot 2 and line 15 of the odd frames. It is not reset on leads T28, L361 and $F_e$ until time slot 28 and line 361 of the even frames.

To avoid confusion with writing, which takes place during odd time slots, reading is relegated to even time slots. Since writing first occurred with time slot 9 and was completed four microseconds later, reading could begin in the middle of time slot 10, but any latent overlap is avoided by the postponement of reading by a signal on lead T14 until time slot 14, as indicated for the first time slot OR gate 119–1. Because of the half rate required for band compression, reading takes place every eighth time slot as contrasted with every fourth time slot for writing. Consequently, the second reading through lead T22 is at time slot 22. There being but twenty-eight time slots in a line, the next reading through lead T2 must be deferred until time slot 2 of the succeeding line. Further readings controlled by the second time slot OR gate 120–1 take place by signals on leads T10, T18 and T26 at time slots 10, 18 and 26. Note that for odd frames the first time slot OR gate 119–1 is active during odd lines, while the second time slot OR gate 120–1 is active during even lines. However, the last line of an odd frame is also odd so that reading during the even lines of the succeeding even frame will be governed by the first time slot OR gate 119–1, and, correspondingly, the reading during the odd lines of the even frame are determined by the second time slot OR gate 120–1. The bridging function between even and odd lines and between even and odd frames is provided by first and second alternator networks 121–1 and 121–2 (FIG. 7*b*) made up of AND and OR gates energized through leads $F_e$, $L_e$, $F_o$ and $L_o$ and $F_e$, $L_o$, $F_o$ and $L_e$. The networks 121–1 and 121–2 act respectively with the first and second time slot OR gates 119–1 and 120–1.

The time slot and frame signals of the reading enablement network 103–2 (FIG. 7*b*) operate the reading coordinator AND gate 110–2. An enabling pulse is conveyed through a second controller selector switch 104–2 set in its "send" position S to a reading control AND gate 102–2. There, a triggering input is provided along a reading control lead 112–2 connected to the seventh picture element lead P7 of the distributor 44–*b* in FIG. 6*a* through a delay network 113–2 which provides the phasing necessitated by the time displacement between the advance and gating functions of the shift registers 63–1 through 63–6 in FIG. 4*b*. The seventh picture element pulse has been chosen because it accurately identifies the midposition of each time slot at which reading is to commence. The read counter 101–2, activated by the reading control AND gate 102–2, and its associated read translator 118–2 perform functions similar to those previously described for the write counter 101–1 and write translator 118–1 by providing pulses on the controller output gating lead C4 and on the successive leads forming the store reading bundle C3.

The synchronizing pulses accompanying transmitted signals and appearing on the synchronizing lead C5 of the controller 33–*b* are produced by the synchronizing flip flops 122–1 and 122–2 of FIG. 7*b*. The reading of the six bits forming the final picture element of each scanned line occurs during the middle of time slot 26, but eight subsequent time slots elapse before the bits are dispatched from the output shift registers 71–1 through 71–6 in FIG. 4*b*. As a result, these final bits will reach the adder 76–*b* during time slot 6 of a subsequently scanned line. Eight time slots later, or at time slot 14, the first bit of the subsequent line will itself appear at the adder 76–*b*. During one-half of the intervening period, namely, from time slots 8 through 11 because of signals on leads T8 and T11, the output of the line synchronization flip flop 122–1 co-operates with the signal from the second alternator network 121–2 at the synchronizing AND gate 123 during odd lines of even frames and even lines of odd frames. The resulting pulses appear on the synchronizing lead C5 by way of an OR gate 124 and a third control selector switch 104–3 set in its "send" position S and provide a line synchronization frequency of approximately 5,000 cycles per second.

The second synchronizing flip flop 122–2 of the controller 33–*b* generates the markers on the synchronizing lead C5 that identify the beginning of a frame. By the concerted actions of signals on leads T9, L1, $F_o$ and T28 the frame pulses commence at time slot 9 of line 1 during the odd frames and terminate at time slot 28 when the flip flop 122–2 is reset.

*Processing at a Co-Ordinate Situs of the Signals Received From a Reference Situs*

Refer to FIGS. 8*a* and 8*b* and consider the conversion in the United States of digital band-compressed signals received from Great Britain. The British transmission is monitored by an American receiver 77–*a* (FIG. 8*a*) and partitioned from its synchronizing pulses in a separator 42–*a* after passage through a first selector switch 130–1 set in its "receive" position R.

The synchronizing pulses enter a timing network 34–*a* similar to that network 34–*b* of the British interchanger in FIG. 4*a*. As before a phase comparator 47–*a* assures proper phasing of the master oscillator 45–*a*. Incoming synchronizing pulses at the band-compressed British format line rate are compared with similar rate pulses derived from a British counter chain 131–B of the distributor 44*a* through a distributor selector switch 132–1 set in its "receive" position R.

The output pulses Φ of the oscillator 45–*a* have the requisite frequency of approximately eight megacycles for sampling at the American picture element rate. This frequency is divided by four in the first stage 133–1 of a picture element counter 133 to provide recurrent pulses Φ/4 at the two-megacycle rate of the band-compressed signals received from Great Britain.

Operating through a third selector switch 130–3 set in its "receive" position R, the quarter-rate pulses Φ/4 control the entry into a digital storage network 32–*a* (FIGS. 8*a* and 8*b*) of video information received directly from the separator 42–*a* through a second selector switch 130–2 set in its "direct" position D. To handle received signals in analog form, the second selector switch 130–2 is set in its "encode" position E, whereupon video information from the separator 42–*a* is sampled in a sampler 31–*a* and digitized by an encoder 60–*a*.

The digital storage network 32–*a* is similar to that network 32–*b* described in conjunction with the British interchanger of FIGS. 4*a* and 4*b* except that it is provided with two stores 135–1 (FIG. 8*a*) and 135–2 (FIG. 8*b*), both of which include stretchers in their columnar inputs similar to those 70–1 through 70–336 associated with the store 62 in FIG. 4*b*. A further modification is the provision, in the gating-in circuit 136 (FIG. 8*a*), of a delay line furnishing a time lag for the pulses Φ or Φ/4 that is one-half of the time interval between recurring full-rate pulses Φ. In this way the gating and advance functions of the input shift registers 137 are prevented from overlapping irrespective of the setting of the third selector switch 130–3.

The six input shift registers 137 accommodate the information handled by the six output shift registers 71–1 through 71–6 in Great Britain (FIG. 4*b*) so that after eight time slots their contents are to be entered into the first store 135–1. This results from the application of a pulse on the controller input gating lead C'1 to a sequence of AND gates in a store input gating circuit 138 similar to that used in conjunction with the British store 62 of FIG. 4*b*.

The gating pulse is derived from the British rate controller 150–B of the interchanger controller 33–*a* (FIG. 8*b*) through a first controller OR gate 151–1. The timing signals of the controller 150–B originate with a British counter chain 131–B (FIG. 8*a*) whose outputs are akin to those produced by the distributor 44–*b* of FIG. 6*a*. Comparable timing signals, except for their being at the rate of the American standards, energize the American controller 150–A (FIG. 8*b*). The outputs of the controllers 150–B and 150–A that perform similar functions are co-ordinated through respective OR gates 151–1 through 151–4.

The British and American counter chains 131–B and 131–A (FIG. 8*a*) are timed with respect to each other by a synchronizer 134 which is driven by a signal from the timing AND gate 43–*a* marking the simultaneous occurrence of the frame and the line synchronization pulses. The operations of the American and British counter chains 131–A and 131–B, the synchronizer 134 and both the British and the American rate controllers 150–B and 150–A are subsequently considered in greater detail.

Return to the digital storage network 32–*a* (FIGS. 8*a* and 8*b*). Its operation will be better understood if considered in conjunction with the graphs of FIG. 9*a* which are comparable to those of FIG. 5*a*. These graphs have parallel abscissal scales with periodic American and British frame markers, AF and BF. The markers denominate the reference frames generated by the British and American counter chains 131–B and 131–A (FIG. 8*a*). An auxiliary abscissal scale, having asterisked frame markers and commencing with the occurrence of the third American reference frame marker AF3, identifies the reconstituted frames F1*, etc., created from the British picture elements by the co-ordinated scan and band conversions performed in the digital storage network 32–*a*.

Having been band compressed in Great Britain, the signals entered into the first store 135–1 (FIG. 8*a*) are those portrayed by the reading graphs in FIG. 5*a*. Gating into the store begins with the fifteenth line, i.e., time L15, of the first British reference frame AF1. As a result of the band compression, two British frame times are required before all of the picture elements of a frame have entered the first store 135–1 in response to the successive occurrences of British rate controller pulses on the controller input gating lead C′1 and the first store writing bundle C′2. This is depicted by the first continuous line graph in FIG. 9*a*.

Reading, indicated by the second continuous line graph *ra*–1, is delayed for two American reference frame times, i.e., until time AF3. Otherwise, the quadrupled rate needed for simultaneous band expansion and scan conversion would cause the information being read out to overtake that being stored. Commencing with line 46 of the third American reference frame AF3, the first store 135–1 is interrogated by a signal on the first store reading bundle C′3 and derived from the American rate controller 150–A through the third controller OR gate 151–3.

The 336 digits leaving the first store 135–1 pass through intermediate OR gates 139–1 through 139–336 (FIG. 8*b*) and appear simultaneously at the input leads of the second store 135–2 as well as at the input leads of the store output gating circuit 140 which regulates the access of the stored information to the six output shift registers 141.

A signal on the second store writing bundle C′6 originating with the American rate controller 150–A causes the bits to enter the first row of the second store 135–2. That this storage is co-ordinated with the reading of the first store 135–1 is demonstrated by the first dashed line graph *wa*–2 of FIG. 9*a*.

A pulse on the controller output gating lead C′4, activated by the American rate controller 150–A through a fourth controller OR gate 151–4, causes the transitory bits to enter the six output shift registers 141.

With each occurrence of a sampling pulse Φ produced by the master oscillator 45–*a* (FIG. 8*a*) and applied to the output shift registers 141 (FIG. 8*b*) through a fourth selector switch 130–4 set in its "receive" position R, the fifty-six bits that enter the registers 141 are serially applied in groups of six, forming a picture element, to a pulse code demodulator 78–*a*. To compensate for the accumulative delay in the operations of the output shift registers 141, the sampling signal Φ that operates the decoder 78–*a* is first passed through a delay line 80–*a* to assure correct phasing.

It is to be noted that the input shift registers 136 operate at a two-megacycle rate, while the output shift register 141 function at an eight-megacycle rate. Thus, the operating rates are in the four-to-one ratio required for simultaneous band expansion and scan conversion. And the eight-megacycle rate of the decoder 78–*a* results in picture signals of four megacycles so that the reduced bandwidth British picture is seen without further degradation by American viewers.

The output from the decoder 78–*a* passes through a fifth selector switch 130–5 set in its "decode" position K to an adder 76–*a* where it is combined with a masking signal furnished by the controller masking lead C′9 and synchronizing pulses furnished by the controller synchronizing lead C′10. The synchronizing pulses are created at the American rate controller 150–A by a synchronizing generator operating subject to American standards. The masking is required because, in keeping with the American format, a picture signal must be presented to the utilization circuit during line 17. Since the reconstituted picture is not available until line 46, a mask of average brightness is provided in the interim.

It is to be observed from FIG. 9*a* that while the first reconstituted frame is being applied to the utilization circuit 36–*a* of FIG. 8*b* through a sixth selector switch 130–6 set in its "receive" position R, a second received frame is being entered into the first store 135–1 of FIG. 8*a* over two British frame intervals as shown by the third continuous line graph *wa*–3. This second received frame is unavailable for processing until the time of fifth American reference frame AF5 whereupon it is scan and band converted into the third reconstituted frame F3*. The second reconstituted frame F2* is supplied by extracting from storage the band and scan converted frame held in the second store 135–2. This extraction requires the concerted action of pulses amanating from the American rate controller 150–A on the controller output gating lead C′4 and on the individual leads of the second store reading bundle C′7. The second dashed line graph *ra*–2 in FIG. 9*a* is indicative of this operation. Although there is an overlap with the third continuous line graph *wa*–3, there is no storage interference since the processing indicated by the continuous and dashed line graphs *wa*–3 and *ra*–2 respectively takes place in the first and second stores 135–1 and 135–2.

The third received frame, indicated by the fourth solid line graph *wa*–6 in FIG. 9*a*, is accumulated in the first store 135–1 during the occurrences of the sixth and seventh American reference frames AF6 and AF7. As a result there occurs a two-frame interval before reconstituted American frames derived from the third received frame will be available for scan and band conversion. The two-frame interval gap is closed by repeating, as shown by rewriting graphs *ra*–4 and *ra*–5, the second frame held in storage in the second store 135–2 during the sixth and seventh American reference frame intervals AF6 and AF7 to form the fourth and fifth frames F4* and F5* of the reconstituted signal.

Similar processing takes place for each subsequently received frame, and the pattern of repetition for the scan converted British frames is in the sequence 2, 3, 2, 2, 3 so that each five received British frames are processed to occupy the interval normally occupied by twelve American frames.

*Distributor at the Co-Ordinate Situs*

The distributor synchronizer and counter chains are shown in greater detail in FIG. 10. After being divided by twenty-eight in the picture element counter 133 of FIG. 8*a*, the pulses originating with the master oscillator 45–*a* traverse separate paths 143–1 and 143–2 to the British and American counter chains 131–B and 131–A.

The British counter chain 131–B is similar to the British distributor 44–*b* of FIG. 6*a*, as supplemented by a terminal counter 144 to permit synchronzation with the American chain 131–A. Since the British and American frame times are respectively $\frac{1}{25}$ and $\frac{1}{30}$ of a second, the time required for five British frames is the same as for six American ones. However, the band compression of the received signals makes it necessary to repeat the reconstituted signals at least twice with the result that the synchronization pattern requires ten British frames for twelve American ones. The terminal counter 144 gives a division by five which when coupled with the division by two of the frame counter 96–B makes the tenth British frame readily identifiable.

A further modification of the British counter chain 131–B, as compared with the distributor 44–*b* of FIG. 6*a*, is necessary in recognition of the stretching of the received signals over two frame times. The output on the phase comparator lead 145 is given a supplemental division by two by being obtained from the even line counter 93–B rather than from the time slot counter 90–B.

The American rate counter chain 131–A is similar to that used for British timing. In keeping with American format requirements there is a division by eighteen in the time slot counter 90–A and a division by 525 in the line counter 94–A. An auxiliary counter 146 provides signals for even and odd time slots, and the frame counter 147 has an associated translator 148 for individual identification of frames 1 through 12.

Co-ordination of the two chains 131–A and 131–B with each other, as well as with the received frames, is achieved with a synchronizer 134. The output from the timing AND gate 43–*a* in FIG. 8*a* passes through a second distributor selector switch 132–2 set in its "receive" position R and appears simultaneously at the first synchronizer AND gate 170–1, the first synchronizer OR gate 171–1 and the zero reset terminal 172 of the British line counter 94–B. At the latter two locations the timing signals reset the British chain counters, excepting the terminal one 144, for every received frame. The timing signal at the first AND gate 170–1 co-operates with the terminal counter output to reset the frame counter 147 directly and the remaining counters of the American chain through the second synchronizing OR gate 171–2 every tenth British frame.

The outputs of the various translators and counters are combined into bundles 52–A and 52–B, 53–A and 53–B and 54–A and 54–B that form two groups of three each extending in FIG. 8*a* from the distributor 44–*a* to respective controllers 150–A and 150–B in FIG. 8*b*. Within each group individual leads of the bundles are identified according to the symbolism used in FIG. 6*a* with the prefix A or B, depending upon whether the connected controller is American 150–A or British 150–B.

Some of the timing diagrams for the British counter chain 131–B are illustrated in FIG. 6*b*. Those for the American chain 131–A are similar.

*Operation of the Controllers at the Co-Ordinate Situs During Reception*

In controlling the digital storage network 32–*a* of FIGS. 8*a* and 8*b* the British and American controllers 150–B and 150–A, respectively detailed in FIGS. 11*a* and 11*b*, complement each other. Being in a modified British format, received information is entered into the first store 135–1 (FIG. 8*a*) under the direction of the British controller 150–B, but it is extracted and processed in the second store 135–2 (FIG. 8*b*) according to the dictates of the American controller 135–2.

Aside from a reversal in the direction of information flow, the initial entry into storage in FIG. 8*a* is comparable with the final extraction from storage in FIG. 4*b*. Accordingly, there is a correspondence of logic elements in the circuits of FIG. 11*a* and those of FIGS. 7*a* and 7*b*. With its first controller selector switch 152–1 set in its "receive" position R, the writing enablement network 154 of FIG. 11*a* is identical with the reading enablement network 103–2 of FIG. 7*b* except for the unit change in time slot position to make the time slot OR gates 119–3 and 120–3 operative only during odd time slots. This change is in consequence of the reservation of odd time slots for reading alluded to earlier. Because of the settings of the remaining controller selector switches 152–2 through 152–4 in their "receive" positions R in FIG. 11*a*, if the reading enablement network 103–2 were interchanged with the writing enablement network 103–1 of FIG. 7*a*, the resulting arrangement would be exactly that depicted in FIG. 11*a* for the control AND gate 102–4, the co-ordinator AND gate 110–4, the counter 101–4 and the translator 118–4. From the previous description of the operation of the constituent components of the controller in FIGS. 7*a* and 7*b*, it will be apparent how the controller 150–B of FIG. 11*a* causes received information to be entered into the first store 135–1 in keeping with the continuous line graphs *wa*–1, *wa*–3 *and wa*–6 of FIG. 9*a* that extend over two British frame times.

Next occurring is the reading of the first store 135–1 by logic elements of the controller 150–A of FIG. 11*b*, paralleling those of FIG. 7*b* used in reading the store 62 of FIG. 4. As in FIG. 7*b* a counter 101–5 responds to pulses created by a control AND gate 102–5 in response to simultaneous triggering and enabling signals.

Regarding the triggering signals, it will be recalled from FIG. 7*b* that reading takes place during the middle of a time slot. Considering that the American format has twenty-eight picture elements per time slot, this requires connection of the control lead 112–5 in FIG. 11*b* to the lead AP14 of the translator 155 in FIG. 4*a* on which the fourteenth picture element signal appears via a fifth controller selector switch 156–5 set in its "receive" position R.

In supp'ing the enabling signal, the co-ordinator AND gate 110–5 of FIG. 11*b* relies partly upon time s'ot and line inputs 157–1 and 157–2 comparable in function with those of the co-ordinator AND gates 110–1 through 110–3 of FIGS. 7*a* and 7*b*. In addition the gate 110–5 is provided with a line mask input 157–3.

From FIG. 2*c* it is observed that the reconstituted frames illustrated by the reading graphs *ra*–1 through *ra*–5 of FIG. 9*a* commence with line 46, reach the end of a first field at line 234, pause during the vertical flyback interval until line 309 and finally reach the terminus of a field at line 497. This start-stop line activation is provided by signals on leads AL46, AL234, AL309 and AL497 of the line flip flop 106–5 in the enablement network 158 of FIG. 11*b*. The flip flop 106–5 is placed in its ready condition, before the appearance of a first active picture element during a line to be scanned, by a signal on lead T2 at time slot 2.

The timing input 157–1 of the co-ordinator AND gate 110–5 is energized on lead $T_e$ during even time slots. Since information was entered into the first store 135–1 (FIG. 8*a*) every eighth time slot, it is necessary to read the information every second time slot in order to maintain the four-to-one ratio required for the simultaneous band and scan conversions.

The final input 157–3 to the co-ordinator AND gate 110–5 is needed to satisfy the masking requirements of the reconstituted frames. As indicated in FIG. 2*c* the reconstructed scan lines do not contain sufficient picture information to occupy the entire line interval, and activation of the masking flip flop 159 is accordingly delayed until signals appear on leads AP1 and AT5 at the beginning of time slot 5. While the British format has its first picture element of each line at the beginning of time slot 6, for convenience the digital processing in Great Britain began with time slot 5 (see FIG. 2*a*). Because of the double rate of readout, the first active picture element of the reconstituted line will appear at time slot 5.5, and the leading mask of the reconstituted line extends 1.5 time slots beyond the first American picture element at time slot 4 (refer to FIG. 2*c*). At the end of the line scan a terminal mask extending over two time slots commences with the reset of the masking flip flop by signa's on leads AP1 and AT17 at the beginning of time slot 17.

The complementary outputs of the masking and of the line flip flops 159 and 106–5 respectively determine those partial and full line scan times during which a mask generator 160 provides a line scan of average brightness on the controller masking lead C'8 which is directly connected to the adder 76–*a* of FIG. 8*b*.

The control AND gate 102–5 which activates the counter 101–5 is not responsive to any of the frame signals. Because of the way in which frames are recycled, individual frame control OR gates 161–1 through 161–4 are provided for the respective counter AND gate chains 162–1 through 162–4 that energize individual translators 163–1 through 163–4 whose outputs are respectively available, through controller selector switches 156–2 through 156–4 set in their "receive" positions R, on the first store reading bundle C'4–A, the second store writing bundle C'6 and the second store reading bundle C'7. Since writing into the first store 135–1 is regulated by the counter 101–4 of FIG. 11*a* during reception, the "receive" setting R of the first controller selector switch 156–1 is an open position.

The second frame control OR gate 161–2 regulates the reading of the first store 135–1 in FIG. 8*a*. From FIG. 9*a* it is seen directly that such reading occurs for reference frames 3 and 5, i.e., commencing at times AF3 and AF5. Further reading takes place for reference frames 8, 10 and 12 after which this first store reading sequence is repeated.

Writing or rewriting in the second store 135–2 of FIG. 8*b* is regulated by the individual inputs on the third frame control OR gate 161–3. From FIG. 9*a* it is seen that this takes place for reference frames 3, 5 and 6, the latter being for rewriting. Similar writing is needed for reference frames 8, 10, 12 and 1, with the latter again being for rewriting, after which the sequence is repeated.

The fourth frame control OR gate 161–4 is responsible for the reading of the second store 135–2. Again, from FIG. 9*a* it is seen that such reading takes place for reference frames 4, 6 and 7. Like reading is needed for reference frames 9, 11 and 1, after which the sequence is repeated.

The signals that leave the decoder 78–*a* of FIG. 8*b* are combined with the synchronizing pulses meeting American format standards and appearing on the synchronizing lead C'9 in FIG. 11*b*. These pulses are produced by an American standards generator 164 having a line rate input 165–1 from leads at the beginning of the first time slot of each line and a frame rate input 165–2 from an AND gate 166 whose output appears in response to signals on leads AP14, AT1 and AL1 at the beginning of the first time slot of the first line.

*Processing at a Co-Ordinate Situs for Transmission to a Reference Situs*

Assume that the British format is chosen as a reference for the transmission to Great Britain of picture signals generated in the American format. Picture signals scanned by the American camera 30–*a* in FIG. 8*a* are sent through the first selector switch 130–1 set in its "send" position S to the separator 42–*a*. The resulting video signals are sampled in a sampler 31–*a* and routed to a six-bit PCM encoder 60–*a* before being sent through the second selector switch 130–2 set in its "encode" position E. At the encoder 60–*a* processing parallels that accorded British signals by the interchanger of FIG. 4*a*, with the exception that the sampling rate is approximately eight megacycles, or twice as great as four times the transmission analog bandwidth of one megacycle.

The coded video signals enter a gating network 136 operating at the eight-megacycle sampling rate by virtue of the setting of the third selector switch 130–3 in its "send" position S. Picture elements enter the first store 135–1 according to the writing graphs *w'a*–1, *w'a*–3, *w'a*–5 and *w'a*–8 of FIG. 9*b*, in which the abscissal scales are like those of FIG. 9*a* except for a delay sixteen British line times in the origin BF1 of the British frames as compared with the American ones. The writing signals appearing on the first store writing bundle C'2–A are obtained from the counter 101–5 of FIG. 11*b* through a first controller selector switch 156–1 set in its "send" position S. The designation of particular frames during which the writing portrayed in FIG. 9*b* takes place is determined by the first frame control OR gate 161–1 in FIG. 11*b*.

The sixteen-line time delay of British reference frames precludes the possibility of overlap in the writing and reading of stored information, the latter being demonstrated by the reading graphs *r'a*–1, *r'a*–3 and *r'a*–5 in FIG. 9*b*. As a result, the second store 135–2 in that part of the digital storage network 32–*a* shown in FIG. 8*b* is bypassed in the reading operation which is regulated by the British rate controller 150–*b* of FIG. 11*a*. With the first controller switch 152–1 in its "send" position S, the second co-ordinator OR gate 109–4 co-operates with the line flip flop 106–3 at the co-ordinator AND gate 110–4 to provide counter directing pulses similar to those obtained from the enablement network 154 during writing. Inputs to the second and first co-ordinator OR gates 109–4 and 109–3 are similar except for the use of even time slots in the former and a reversal of connections to the alternators 167–1 and 167–2. As dictated by the four-to-one conversion rate, the enablements are every eighth time slot.

The functions and modes of operation of the synchronizing flip flops 168–1 and 168–2 are similar to those of the corresponding flip flops 122–1 and 122–2 in FIG. 7*b*, previously discussed, and the remaining selector switches 152–2 through 152–4 in FIG. 11*a* are all set in their "send" positions S.

To establish the delay of sixteen line times alluded to earlier, the second distributor switch 132–2 in FIG. 10 is set in its "send" position S. This allows the British line counter 94–B to be prematurely reset at a count of 389 instead of 405 by a signal on its auxiliary reset terminal 173. Of course, once the initial time delay is established for the British frames, the counter 94–B will undertake the full count of 405 required in the processing of British format signals. With the changed setting of its switch 132–2 the synchronizer operation at the second synchronizing AND gate 170–2 and at the second synchronizing OR gate 171–2 parallels that discussed during reception. And it is clear that the setting of the first distributor switch 132–1, shown in FIG. 8*a*, in its "send" position S is needed for comparing incoming line synchronization pulses produced by the American camera with comparable rate pulses from the American counter chain.

Thus, with the remaining switches of the interchanger in FIG. 8*b* set in their appropriate positions for transmission, incoming signals in the American format are scan and band converted to a modified British format preparatory to being dispatched by a transmitter 77–*a* over a transmission channel of limited bandwidth.

*Processing at a Reference Situs of the Signals Received From a Co-Ordinate Situs*

Porcessing of digital signals received in Great Britain is similar to that in the United States when the transmission originates in Great Britain. The first selector switch 41–1 in FIG. 4*a* is set in its "receive" position R while the second selecter switch 41–2 is set in its "direct" position D, thus allowing the digital signals monitored by a receiver 82–*b* to be sent directly to the digital storage network 32–*b* (FIG. 4*b*) after the segregation of video and synchronizing components. The advance pulses $\varphi/2$ obtained by setting the third selector switch 41–3 in its "receive" position R at the required half rate for writing the received frames according to the writing graphs *wb'*–1, *wb'*–3 and *wb'*–5 having an abscissa with odd and even frame markers $F_o$ and $F_e$ in FIG. 5*b*. This is accomplished under the control of the write counter 101–1 of FIG. 7*a* by virtue of the setting of the first controller selector switch 104–1 in its "receive" position R.

Reading is delayed until even frames. Alternate reconstituted frames, indicated by reading graphs *rb'*–1 and *rb'*–3, are denominated with respect to a second abscissal scale whose origin F1 is delayed one frame. The reading is controlled by the read counter 101–2 of FIG. 7*b* in consequence of the setting of the second controller selector switch 104–2 in its "receive" position R. The resulting performance of the co-ordinator AND gate 110'–2 and its associated gates is similar to that of the co-ordinator AND gate 110–2, previously described.

Because each reconstituted frame must be displayed twice, the reading of a frame is closely followed by its being rewritten. Rewriting requires the setting of the fourth controller switch 104–4 in FIG. 7*a* in its "receive" position R. This allows the co-ordinator AND gate 110–3 and the control AND gate 102–3 to become operational, thereby causing the entry of information recirculated on the rewrite bundle 74 associated with the store of FIG. 4b during even frame times $F_e$, as indicated by the rewrite graphs wb′–2 and wb′–4 of FIG. 5b. It is to be noted that there is but a single time slot delay between the reading and the rewriting regulated by the reading and rewriting time slot OR gates 111–2 and 111–3 of FIGS. 7b and 7a, respectively.

The rewritten frames are taken from storage during the odd frame times $F_o$ indicated by the repeat reading graphs rb′–2 and rb′–4 of FIG. 5b. As with the reading that occurred earlier, the repeat reading is under the control of the read counter 101–2 inasmuch as the coordinator AND gate 110′–1 connected to the read counter 101–2 by the setting of the second controller selector switch 104–2 in its "receive" position R is operative during each frame.

At the distributor of FIG. 6a both the first and second selector switches 92–1 and 92–2 are set in their "receive" positions R. The first of these supplies the comparator 47–b in FIG. 4a with a timing signal that is of comparable frequency with that received on the line synchronization lead. The second selector switch 92–2 allows the even frame counter 96 to be reset along with all the other counters of the British chain for each received frame, as stretched over two frame intervals.

Accordingly, the band compressed and scan converted signals transmitted from the United States are rendered compatible for viewing on a British reproducer 36–b when the remaining selector switches 41–4, 41–5 and 41–6 of that part of the British interchanger shown in FIG. 4b are set in their "receive" and "decode" positions R and K. Synchronizing pulses meeting British format standards are obtained from the British standards generator 125 in FIG. 7b through the setting of the third controller selector switch 104–3 in its "receive" position R. The operation of this generator 125 is similar to that of the generator 164 of FIG. 11b.

If the signals received from the United States are in analog form, the separator 42–b is modified correspondingly and the second selector switch 41–2 set in its "encode" position E.

What is claimed is:

1. Apparatus for preparing a wave generated at a first situs in a first format for transmission to a second situs over a channel of limited bandwidth, which comprises means for sampling the wave to produce consecutive samples that are uniformly distributed in time, means for selecting non-consecutive groups of said samples, means for selecting non-consecutive subgroups of said selected groups, storage means, means for consecutively entering the samples of the selected subgroups into adjacent storage positions of said storage means, and means for extracting the samples stored over a group time interval from said storage means at a uniform rate causing them to be distributed in time over less than the interval extending from the time of occurrence of the first sample of each selected group to the time of occurrence of the first sample of the immediately succeeding selected group.

2. Apparatus as defined in claim 1 wherein said subgroup selecting means comprises means for selecting periodic sets of said samples.

3. The method of preparing a wave generated at a first situs in a first format and transmitted to a second situs over a channel of limited bandwidth which comprises the steps of:

(1) Producing discrete and regularly spaced samples of the wave during each format time interval;
(2) Grouping the samples contained within a time interval less than said format time interval;
(3) Omitting at least one intermediate sample from each of the groups;
(4) Entering the non-omitted samples into consecutive storage positions of a storage device; and
(5) Extracting the stored samples from said storage device at a rate causing the samples within each group to be uniformly distributed over a conversion time interval greater than said format time interval.

4. Apparatus for preparing signals generated at a first situs in a first format, having two fields per frame and a total vertical interval time $V_1$ for transmission to a second situs over a channel of limited bandwidth $B_0$, which comprises sampling means for producing, at regular intervals, discrete samples of said signals, selection means for selecting groups of said samples constituting like portions less than the totality of two immediately sequential fields occurring within a time interval $KV_1$, where K is an integer greater than 2, storage means, first control means for entering said selected groups into said storage means, second control means for continuously extracting the stored samples at a uniform rate less than the sampling rate, thereby to preserve the interlace of said fields constituting each frame of the prepared signals.

5. Apparatus as defined in claim 4 wherein said sampling means comprises means for producing said samples at a rate of $KB_0$ samples per second, thereby to accommodate said signals to the bandwidth of said channel with an image continuity of $$\frac{4}{KV_1}$$

frames per second.

6. Apparatus for preparing signals generated at a first situs in a first format, having a bandwidth $B_1$, a number of active lines $n_1$ per frame and an active $h_1$ per line, for transmission to a second situs over a channel of limited bandwidth $B_0$, which comprises sampling means for producing discrete samples of said signals at a rate of 2B samples per second, selection means for selecting groups of said samples occupying the fraction $$\frac{B_0}{B_2}$$

of the frame time of said signals, first control means for entering said selected groups into said storage means, second control means for continuously extracting the stored samples at a uniform rate less than the sampling rate, thereby to preserve the resolution capability of said signals as reconstituted at said situs.

7. Apparatus as defined in claim 6 having an aspect factor $a$ defined by the reciprocal of the square root of said fraction $$\frac{B_0}{B_1}$$

wherein said selection means further comprises means for selecting, as the samples of said group, those samples contained in the portion $$\frac{1}{a}$$

of said time $h_1$ of each of $$\frac{n_1}{a}$$

interlaced lines per frame, thereby to preserve the aspect ratio capability of said signals, as reconstituted at said second situs.

8. Apparatus for processing a wave at a second situs according to a second format, said wave being generated at a first situs in a first format and being transmitted therefrom over a channel of limited bandwidth, which comprises means for producing a group of discrete samples of the wave at a rate $r_1$, storage means, means for consecutively entering the group samples into adjacent storage positions of said storage means, means for sequentially extracting said group samples from said storage means at a rate $r_2$ greater than said rate $r_1$, and means for timing the extractions of said group samples in subgroup intervals separated from each other by a time interval greater than the reciprocal of said rate $r_2$.

9. Apparatus for reconstituting picture signals to accord with a first format having two fields per frame, a number of lines per field $$\frac{n_1}{2}$$

and an active horizontal scan time per line $h_1$, said signals being received from a transmission channel of bandwidth $B_0$ in accord with a band converted second format having selected pairs of immediately sequential fields, a number of lines per field $$\frac{n_2}{2}$$

and an expanded active horizontal scan time per line $$\frac{Kh_1}{2}$$

where K is an integer greater than 2, which comprises sample storage means, means for entering the samples of said signals into said storage means at a rate of $2B_0$ samples per second, means for extracting samples contained within each line of said second format at a rate of $$KB_0\left(\frac{h_2}{h_1}\right)\left(\frac{n_1}{n_2}\right)$$

samples per second to form reconstituted line signals, means for collating $$\frac{n_1}{2}$$

successive reconstituted lines according to said first format to form reconstituted field signals, and means for interlacing reconstituted pairs of field signals which are immediately sequential in time, thereby to form reconstituted frame signals of said picture signals.

10. In a system for transmitting a first vision signal having a preassigned aspect ratio through a transmission channel of bandwidth $B_0$ and for converting said first vision signal into a second vision signal having the same aspect ratio, said first vision signal being generated at a first geographic location in a format having an unblanked horizontal scan time $h_1$, a frame time $f_1$, a number of lines per frame $n_1$ and a bandwidth $B_1$ greater than twice said channel bandwidth $B_0$, said second vision signal being adapted for reproduction at a second geographical location in a format having an unblanked horizontal scan time $h_2$, a frame time $f_2$ less than said frame time $f_1$, a number of lines per frame $n_2$ and a bandwidth $B_2$ greater than twice said channel bandwidth $B_0$, means at said first location for sampling alternate frames of said vision signals on a line-by-line basis at a rate $4B_0$ samples per second, a first store, means for consecutively writing said samples into said first store, means for consecutively reading said samples out of said first store at a rate $2B_0$ samples per second, thereby to stretch the samples of each one of said alternate frames over the period normally occupied by two successive ones of said frames, means for transmitting the stretched samples over said transmission channel to said second location, a second store at said second location, means for consecutively writing said stretched samples into said second store, means for consecutively reading the samples out of said second store on a line-by-line basis at a conversion rate, in samples per second, which is the product of the factor $4B_0$, the factor $h_1/h_2$, and the factor $n_2/n_1$, thereby to form scan lines of said second vision signal wherein said factor $4B_0$ provides band conversion, said factor $h_1/h_2$ provides horizontal scan conversion and said factor $n_2/n_1$ preserves said aspect ratio, $n_1$ of said scan lines contributing a conversion frame of said second vision signal, means for variably repeating successive conversion frames a number of times determined from the quotient of twice the frame-time factor $f_1/f_2$ and said quotient plus one, thereby to achieve vertical scan conversion, and means for reproducing said repeated frames as said second vision signal.

References Cited in the file of this patent

UNITED STATES PATENTS 2,219,021 Riesz ________________ Oct. 22, 1940